(12) United States Patent
Tokishige

(10) Patent No.: US 8,014,015 B2
(45) Date of Patent: Sep. 6, 2011

(54) PRINT DATA PROCESSING SYSTEM, PRINTER, AND DATA PROCESSING INDICATING APPARATUS

(75) Inventor: Masato Tokishige, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1056 days.

(21) Appl. No.: 11/893,324

(22) Filed: Aug. 15, 2007

(65) Prior Publication Data

US 2008/0043284 A1 Feb. 21, 2008

(30) Foreign Application Priority Data

Aug. 15, 2006 (JP) ................................ 2006-221444

(51) Int. Cl.
*G06F 3/12* (2006.01)
(52) U.S. Cl. ...................... 358/1.15; 358/1.9; 358/1.14
(58) Field of Classification Search .................. 358/1.15, 358/1.14, 1.13, 1.18, 474, 403, 400; 709/274, 709/203, 219, 238, 223, 225; 399/13; 382/100, 382/162, 107
See application file for complete search history.

(56) References Cited

U.S. PATENT DOCUMENTS

| | | | | |
|---|---|---|---|---|
| 6,469,796 | B1 * | 10/2002 | Leiman et al. | 358/1.15 |
| 7,398,405 | B2 * | 7/2008 | Aoki et al. | 713/320 |
| 7,515,290 | B2 * | 4/2009 | Negishi et al. | 358/1.15 |
| 7,679,766 | B2 * | 3/2010 | Harada | 358/1.15 |
| 7,916,329 | B2 * | 3/2011 | Iizuka et al. | 358/1.15 |
| 2002/0196460 | A1 * | 12/2002 | Parry | 358/1.15 |
| 2003/0206314 | A1 * | 11/2003 | Tanimoto | 358/1.15 |
| 2003/0234948 | A1 * | 12/2003 | Sasaki | 358/1.13 |
| 2004/0032621 | A1 * | 2/2004 | Suzuki et al. | 358/1.18 |
| 2004/0141202 | A1 * | 7/2004 | Okigami | 358/1.15 |
| 2004/0243937 | A1 * | 12/2004 | Gassho et al. | 715/526 |
| 2006/0170966 | A1 | 8/2006 | Watanabe | |

FOREIGN PATENT DOCUMENTS

| | | |
|---|---|---|
| JP | 2003-044236 | 2/2003 |
| JP | 2004-199504 | 7/2004 |
| JP | 2005-071127 | 3/2005 |
| JP | 2005-107710 | 4/2005 |
| JP | 2006-209665 | 8/2006 |

* cited by examiner

*Primary Examiner* — Twyler Haskins
*Assistant Examiner* — Dennis Dicker
(74) *Attorney, Agent, or Firm* — Edward Angell Palmer & Dodge LLP; David G. Conlin; David A. Tucker

(57) ABSTRACT

To provide a print data processing system, a printer, and a data processing indicating apparatus, for storing print data and a print history and notifying update of the print data, which is not necessarily registered separately in order to receive a notification of update. The printer stores name data of print data, identification data of a data processing indicating apparatus (or an external apparatus) that has sent storage indicating data of the print data, and identification data of a data processing indicating apparatus (or an external apparatus) that has sent print indicating data of the print data; judges if the print data is updated or not on the basis of the stored data; and notifies each data processing indicating apparatus (or the external apparatus) that has sent print indicating data of the print data of update of the print data.

8 Claims, 23 Drawing Sheets

FIG.3A

| MANAGEMENT NUMBER | REGISTERED NAME | CREATE DATE AND TIME | IDENTIFICATION NUMBER OF MARKER | NUMBER OF PRINTING PERSON(S) | IDENTIFICATION NUMBER OF PRINTING PERSON |
|---|---|---|---|---|---|
| ... | ... | ... | ... | ... | ... ... ... |
| 00100 | Z MODEL SPECIFICATION | 2006/1/1 09:00:00 | ...... | . | . ... . |
| 00101 | A MODEL SPECIFICATION | 2006/3/1 09:00:00 | 111111 | 0 | 0 0 0 |
| ... | ... | ... | ... | ... | ... ... ... |

FIG.3B

| MANAGEMENT NUMBER | REGISTERED NAME | CREATE DATE AND TIME | IDENTIFICATION NUMBER OF MARKER | NUMBER OF PRINTING PERSON(S) | IDENTIFICATION NUMBER OF PRINTING PERSON |
|---|---|---|---|---|---|
| ... | ... | ... | ... | ... | ... ... ... |
| 00100 | Z MODEL SPECIFICATION | 2006/1/1 09:00:00 | ...... | . | . ... . |
| 00101 | A MODEL SPECIFICATION | 2006/3/1 09:00:00 | 111111 | 1 | 111111 0 0 |
| ... | ... | ... | ... | ... | ... ... ... |

FIG.3C

| MANAGEMENT NUMBER | REGISTERED NAME | CREATE DATE AND TIME | IDENTIFICATION NUMBER OF MARKER | NUMBER OF PRINTING PERSON(S) | IDENTIFICATION NUMBER OF PRINTING PERSON |
|---|---|---|---|---|---|
| ... | ... | ... | ... | ... | ... ... ... |
| 00101 | A MODEL SPECIFICATION | 2006/3/8 12:00:00 | 111111 | 0 | 0 0 0 |
| ... | ... | ... | ... | ... | ... ... ... |

FIG.3D

| MANAGEMENT NUMBER | REGISTERED NAME | CREATE DATE AND TIME | IDENTIFICATION NUMBER OF MARKER | NUMBER OF PRINTING PERSON(S) | IDENTIFICATION NUMBER OF PRINTING PERSON | | |
|---|---|---|---|---|---|---|---|
| ... | ... | ... | ... | ... | ... | ... | ... |
| 00101 | A MODEL SPECIFICATION | 2006/3/1 09:00:00 | 111111 | 2 | 111111 | 222222 | 0 |
| 00102 | B MODEL SPECIFICATION-1 | 2006/3/1 12:15:00 | 222222 | 2 | 111111 | 333333 | 0 |
| 00103 | C MODEL SPECIFICATION | 2006/3/1 17:40:00 | 333333 | 3 | 111111 | 222222 | 333333 |
| 00104 | B MODEL SPECIFICATION-2 | 2006/3/2 21:25:00 | 222222 | 2 | 111111 | 333333 | 0 |
| 00105 | D MODEL SPECIFICATION | 2006/3/3 08:30:00 | 444444 | 1 | 444444 | 0 | 0 |
| ... | | | | | | | |

FIG.3E

| MANAGEMENT NUMBER | REGISTERED NAME | CREATE DATE AND TIME | IDENTIFICATION NUMBER OF MARKER | NUMBER OF PRINTING PERSON(S) | IDENTIFICATION NUMBER OF PRINTING PERSON | | |
|---|---|---|---|---|---|---|---|
| ... | ... | ... | ... | ... | ... | ... | ... |
| 00101 | A MODEL SPECIFICATION | 2006/3/1 09:00:00 | 111111 | 1 | 222222 | 0 | 0 |
| 00102 | B MODEL SPECIFICATION-1 | 2006/3/1 12:15:00 | 222222 | 2 | 111111 | 333333 | 0 |
| 00103 | C MODEL SPECIFICATION | 2006/3/1 17:40:00 | 333333 | 3 | 111111 | 222222 | 333333 |
| 00104 | B MODEL SPECIFICATION-2 | 2006/3/2 21:25:00 | 222222 | 2 | 111111 | 333333 | 0 |
| 00105 | D MODEL SPECIFICATION | 2006/3/3 08:30:00 | 444444 | 1 | 444444 | 0 | 0 |
| ... | | | | | | | |

FIG. 4A

| REGISTERED NAME | CREATE DATE AND TIME | IDENTIFICATION NUMBER OF MARKER |
|---|---|---|
| A MODEL SPECIFICATION | 2006/3/1 09:00:00 | 111111 |

FIG. 4B

| REGISTERED NAME | CREATE DATE AND TIME | IDENTIFICATION NUMBER OF MARKER |
|---|---|---|
| A MODEL SPECIFICATION | 2006/3/8 12:00:00 | 111111 |

FIG. 4C

| REGISTERED NAME | CREATE DATE AND TIME | IDENTIFICATION NUMBER OF MARKER |
|---|---|---|
| B MODEL SPECIFICATION-1 | 2006/3/8 17:40:00 | 222222 |

FIG. 4D

| REGISTERED NAME | CREATE DATE AND TIME | IDENTIFICATION NUMBER OF MARKER |
|---|---|---|
| B MODEL SPECIFICATION-2 | 2006/3/8 17:45:00 | 222222 |

FIG. 5A

| IDENTIFICATION NUMBER OF PRINTING PERSON | MANAGEMENT NUMBER | | | |
|---|---|---|---|---|
| 111111 | 00102 | 0 | 0 | 0 |
| 333333 | 00102 | 0 | 0 | 0 |
| ..... | ..... | ..... | ..... | ..... |

FIG. 5B

| IDENTIFICATION NUMBER OF PRINTING PERSON | MANAGEMENT NUMBER | | | |
|---|---|---|---|---|
| 111111 | 00102 | 00104 | 0 | 0 |
| 333333 | 00102 | 00104 | 0 | 0 |
| ..... | ..... | ..... | ..... | ..... |

FIG. 17B

⑦ → S1715 NOTIFICATION OF ONLY THIS UPDATE?

YES → S1716 CREATE NOTIFICATION DATA → S1717 NOTIFY UPDATE → S1718 CORRECT CREATE DATE AND TIME, NUMBER OF PRINTING PERSON(S), IDENTIFICATION NUMBER OF PRINTING PERSON → S1719 ⑧

NO → S1720 COLLECTIVELY STORE IN 3RD MANAGEMENT TABLE → S1721 UPDATE CREATE DATE AND TIME → S1722 COLLECTIVELY NOTIFY?

YES → S1719

NO → S1723 CREATE COLLECTIVE NOTIFICATION DATA → S1724 NOTIFY COLLECTIVELY → S1725 CORRECT NUMBER OF PRINTING PERSON(S), AND IDENTIFICATION NUMBER OF PRINTING PERSON

S1719 STORE RECEIVED PRINT DATA IN HDD → END

FIG. 18A

◆ELECTRONIC DOCUMENT
 UPDATE NOTIFICATION◆

·A MODEL
  SPECIFICATION      2006/03/08 12:00:00

FIG. 18B

◆ELECTRONIC DOCUMENT
 UPDATE NOTIFICATION◆

·A MODEL
  SPECIFICATION      2006/03/08 12:00:00

--MESSAGE FROM UPDATER--
  INCLUDING ADDITIONAL
  INFORMATION

FIG. 18C

◆ELECTRONIC DOCUMENT
 UPDATE NOTIFICATION◆

·B MODEL
  SPECIFICATION-1    2006/03/08 17:40:00
·B MODEL
  SPECIFICATION-2    2006/03/08 17:45:00

PRINT DATA PROCESSING SYSTEM, PRINTER, AND DATA PROCESSING INDICATING APPARATUS

CROSS-REFERENCE TO RELATED APPLICATIONS

This non-provisional application claims priority under 35 U.S.C. §119(a) on Patent Application No. 2006-221444 in Japan on Aug. 15, 2006, the entire contents of which are hereby incorporated by reference.

BACKGROUND

1. Technical Field

The present invention relates to a data processing indicating apparatus, a printer, and a print data processing system to which the printer is connected.

2. Description of Related Art

In recent years, on a network such as Internet and Intranet, electronic data, for example, image data and text data are frequently opened so as to share the electronic data with a plurality of users. This results in an effect to eliminate wasteful repetition and double operation that a plurality of users creates the same data, respectively. On the other hand, among the electronic data, there are some to be updated irregularly, so that the user requiring the electronic data should check update of the electronic data constantly.

SUMMARY

Therefore, in order to solve these disadvantages for the user side, various arts have been suggested. In other words, the art for notifying the computer of the update information when update is made is suggested. For example, an update notifying apparatus which can designate only electronic documents interesting for the user as an object to be notified (for example, refer to Japanese Patent Application Laid-Open No. 2004-199504) has been suggested. In addition, for example, a data management system for deciding the user to be notified of the update in accordance with an access authority set for the updated electronic document (for example, refer to Japanese Patent Application Laid-Open No. 2005-107710) has been suggested. Therefore, particularly with respect to the electronic documents that are frequently updated, whether the electronic document has been updated or not is checked to notify the user of it. In addition, a document management method for saving electronic data every time the user saves as another version and printing the electronic data of the version of the desired time when the user requests to browse (for example, refer to Japanese Patent Application Laid-Open No. 2005-071127) has been suggested. For any of these arts, registration for receiving notification of update is needed in advance in order for the user to receive notification of update of the electronic data. When there is a plurality of electronic data whose update should be notified, registrations for each of the number of the electronic data are needed in advance.

There is a so-called printing system in which a plurality of information processors and printers are connected via a communication network and in which the printers are shared by a plurality of users of respective information processors. For this printing system, the art having the similar function as the above-described art has been also suggested. In other words, the printer is provided with means for storing the print data that is created by the user using the information processor, so that the printing system enables the user to use the print data stored by other users.

The conventional printing system enables sharing the print data, but on the other hand, it does not recognize update of the print data. Although the application of the above-described art for notifying update of the electronic data is considerable, in order for the user to receive notification of update of the print data in the same way as in the above-described art, registration for receiving notification of update is needed in advance. In the case that there is a plurality of print data whose update should be notified, registrations for each of the number of the electronic data are needed in advance.

An object is to provide a print data processing system and a printer that allow the printer to store print data and a print history and notify a plurality of data processing indicating apparatuses (or external apparatuses), which have referred and/or have printed the print data, of update of the print data. Therefore, it is not necessary for the user to make registration in advance in order to receive notification of update.

Other object is to provide a print data processing system and a printer that can prevent wasteful notification to the user of the date processing indicating apparatus, that has already known update of the print data.

Further, other object of is to provide a print data processing system that can attach desired data to notification of update.

Still further, other object is to provide a print data processing system that allows the user to determine whether to have notification of update or not, so as to avoid wasteful notification.

Still further, other object is to provide a print data processing system that can notify update of a plurality of print data collectively.

There is provided a print data processing system according to an aspect, comprising: a printer for printing the print data, which includes an interface for sending and receiving data and a storage for storing the print data that is received via the interface therein; and a plurality of data processing indicating apparatuses, each of which includes an interface for sending the data, each of the data processing indicating apparatus sending, to the printer via the interface, identification data of itself, name data of the print data, and any one among storage indicating data that is attached to the print data, the print data, and print indicating data of the print data that is stored in the storage; wherein the storage stores the name data, the identification data of the data processing indicating apparatus that has sent the storage indicating data; and identification data of the data processing indicating apparatus that has sent the print indicating data, the name data being related to the identification data of the data processing indicating apparatus that has sent the storage indicating data and the identification data of the data processing indicating apparatus that has sent the printer indicating data; wherein the printer further comprising a controller for performing operations of updating the print data that is received by the printer, and is stored in the storage and generating update notification data for notifying update of the print data; and wherein the printer sends the update notification data to the data processing indicating apparatus corresponding to the identification data that is related to the name data of the updated print data via the interface.

There is provided a printer, which comprises an interface for sending and receiving the data and a storage for storing print data in response to the storage indicating data from an external apparatus and which prints the print data stored in the storage in response to the print indicating data from the external apparatus, according to an aspect, wherein the storage stores the name data, the identification data of the external apparatus that has sent the storage indicating data, and the identification data of the external apparatus that has sent the print indicating data, the name data being related to the identification data of the external apparatus that has sent the storage indicating data and the identification data of the external apparatus that has sent the print indicating data, wherein the printer further comprising a controller for performing operation of: updating the print data stored in the storage with the print data received from the printer; and generating update notification data for notifying update of the print data, and wherein the printer sends the update notification data to an external apparatus corresponding to the identification data related to the name data of the updated print data.

There is provided a data processing indicating apparatus for sending any one among the print data, the print indicating data of this print data, and the storage indicating data of the print data, according to an aspect, wherein the data processing indicating apparatus sends the identification data of itself to the external apparatus together with any one among the print indicating data and the storage indicating data.

BRIEF DESCRIPTION OF DRAWINGS

FIGS. 3A to 3E are conceptual views showing an example of a first management table;

FIGS. 4A to 4D are conceptual views showing an example of a second management table;

FIGS. 5A to 5B are conceptual views showing an example of a third management table;

FIGS. 17A and 17B show a flow chart for explaining a processing order of a CPU according to the fifth embodiment; and FIGS. 18A to 18C are exemplification views showing one example of a screen that is displayed on the display means of the personal computer in accordance with notification from the multifunctional machine.

DETAILED DESCRIPTION

Hereinafter, a print data processing indicating system will be explained focusing on an example of printing of the print data on the basis of an embodiment using a personal computer as a data processing indicating apparatus and using a multifunctional machine for carrying out printing of the print data and facsimile transmission of the image data or the like of the image data by the operation of the personal computer as a printer.

First Embodiment

Figure 1:
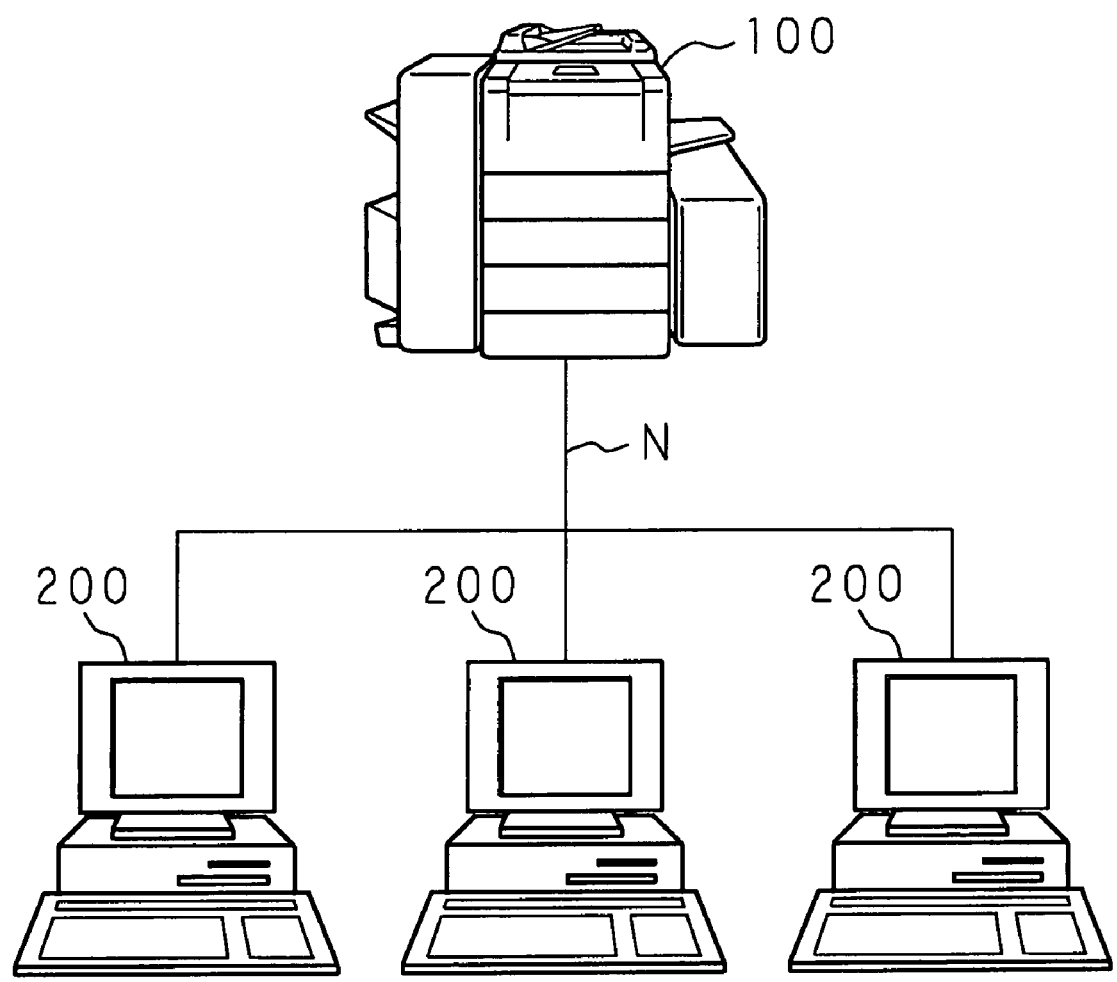
FIG. 1 is a pattern diagram showing a constitutional example of a print data processing system according to a first embodiment.
Figure 2:
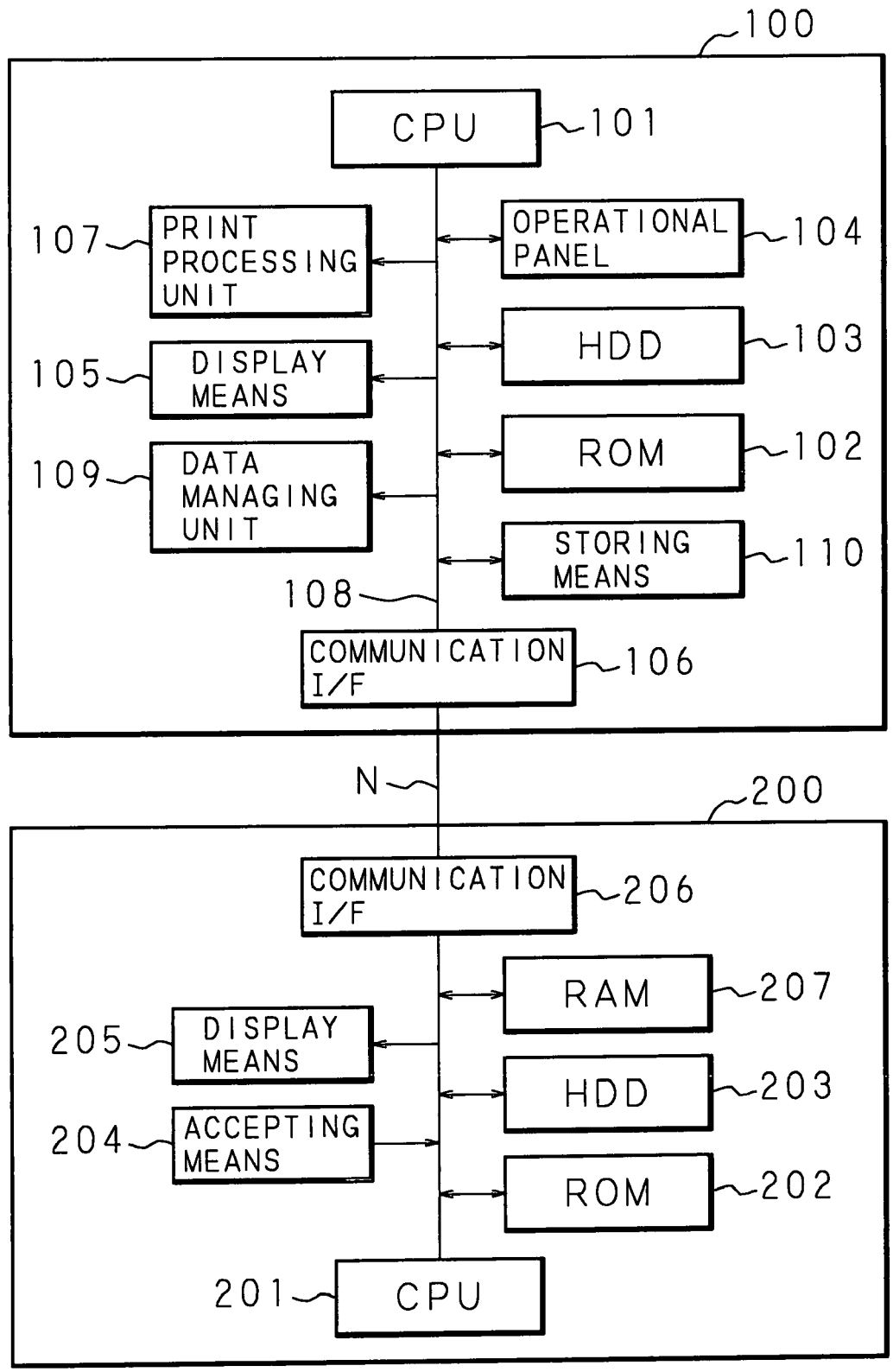
FIG. 2 is a block diagram showing a constitutional example of a print data processing system according to a first embodiment.

FIG. 1 is a pattern diagram showing a constitutional example of a print data processing system according to a first embodiment, and FIG. 2 is a block diagram.

The print data processing system according to the first embodiment is provided with personal computers 200, 200, 200 for transmitting storage indicating data of the print data and the print indicating data to a multifunctional machine 100 and a multifunctional machine 100 for storing the print data by the storage indicating data from the personal computers 200, 200, 200 and printing the stored print data by the print indicating data, and the multifunctional machine 100 and the personal computers 200, 200, 200 are connected with each other via a net work N such as Internet and Intranet.

The print data processing system according to the first embodiment is constituted so that one personal computer 200 can transmit the print data to the multifunctional machine 100 to store the print data, and other personal computers 200, 200 can transmit the print indicating data of the print data to the multifunctional machine 100 to print the data. The above-described one personal computer 200 may transmit this print data with the data for a registered name and a create date and time attached. In addition, in the case of transmitting the storage indicating data or the print indicating data, respective personal computers 200, 200, 200 may transmit the storage indicating data or the print indicating data with an identification data attached to enable the multifunctional machine 100 to recognize itself. This identification data is registered by a manager or a service person, when constituting the print data processing system.

Respective personal computers 200, 200, 200 are provided with a CPU 201 for reading a control program that has been stored in a ROM 202 in advance and executing the control program; a RAM 207 for tentatively storing the data generated during execution of the program; accepting means 204 for accepting the print data or the like that should be transmitted to the multifunctional machine 100; a communication I/F 206 for transmitting the above-described print data to the multifunctional machine 100 and receiving the data from the multifunctional machine 100; an HDD 203 for storing the identification data of itself; and display means 205 for displaying the data received by this communication I/F 206.

In the multifunctional machine 100, a CPU 101 is connected to a ROM 102, an HDD 103, an operational panel 104, a print processing unit 107, a data managing unit 109, display means 105, a communication I/F 106, and storing means 110 via a bus 108.

The control program has been stored in advance in the ROM 102 and the storing means 110 is formed by a RAM for tentatively storing the print data received by the communication I/F 106. The operational panel 104 is disposed on the main body of the multifunctional machine 100 and the operational panel 104 is used for accepting the print instruction of the stored print data (hereinafter, referred to as stored print data) without using the personal computers 200, 200, 200. The image for the operation of the operational panel 104 is displayed on the display means 105. The HDD 103 may store the print data having the storage indicating data attached thereto.

The data managing unit 109 is a writable nonvolatile memory and a part of its storage area is used as a first management table, a second management table, and a third management table.

FIG. 3 is a conceptual view showing an example of the first management table, FIGS. 4A to 4D are conceptual views showing an example of a second management table, and FIGS. 5A and 5B are conceptual views showing an example of a third management table. As shown in FIG. 3A, in the first management table, a management number that is automatically given for each stored print data; a registered name of this stored print data, a create date and time, an identification number of a marker representing the identification data of the personal computer 200 that transmits the storage indicating data of the stored print data; an identification number of a person who prints the data representing the identification data of each personal computer 200, 200 that transmitted the print indicating data of the stored print data; and the number of a person who prints the data representing a sum of the number of the identification data of the person who prints the data are written being related with each other. As shown in FIG. 4A, in the second management table, a registered name of the received print data (hereinafter, referred to as received print data), a create date and time, and an identification number of a person who records the data are written, and in the third management table, an identification number of a person who prints a plurality of the stored print data for collective notification to be described later and a management number of the stored print data that should be collectively notified.

Figure 6:
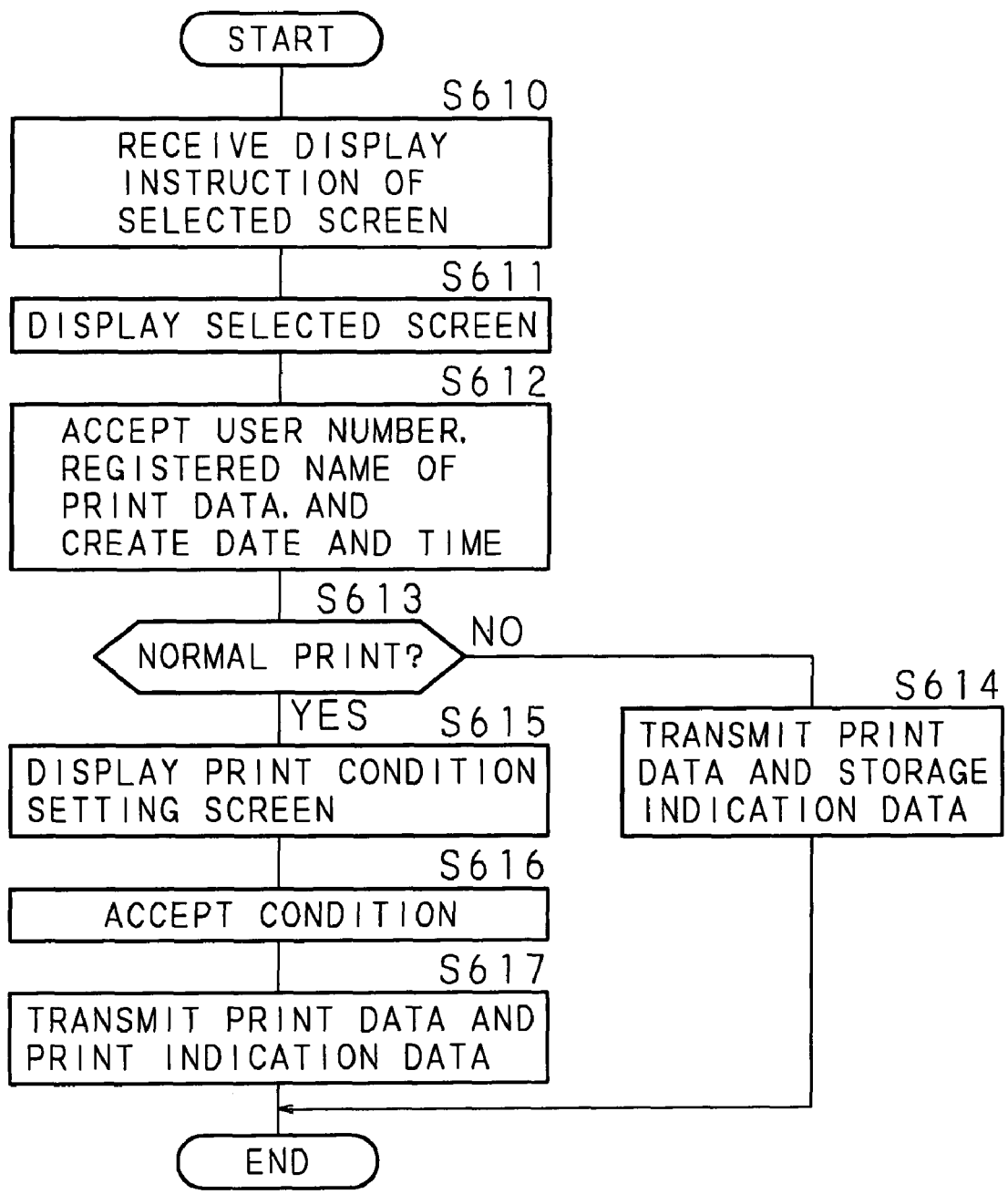
FIG. 6 is a flow chart showing storage or transmission processing of print indicating data by means of a personal computer.
Figure 7:
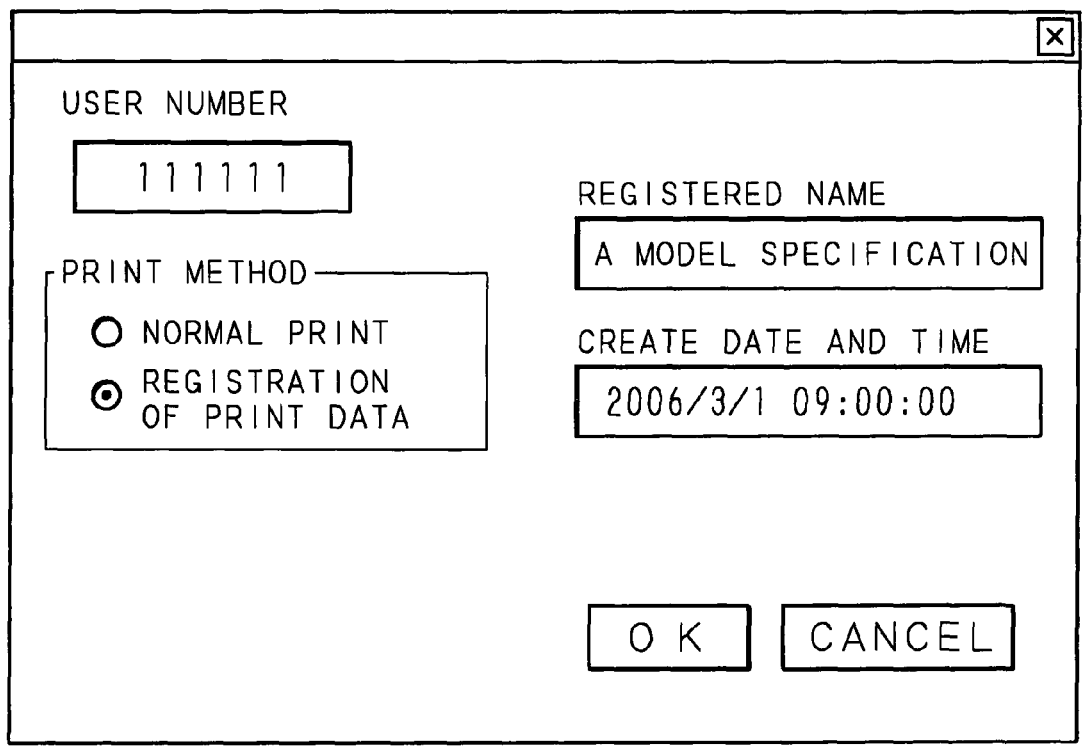
FIG. 7 is an exemplification view showing a constitutional example of a selected screen.

FIG. 6 is a flow chart showing storage or transmission processing of print indicating data by means of personal computers 200, 200, 200. In the case of creating the print data that is an object of printing and indicating the multifunctional machine 100 to print or store the created print data, the user may allow the display means 205 to display the selected screen for selecting storage or indication of printing thereon by selecting a predetermined icon such as a menu column or the like. When receiving the display instruction of the selected screen (S610), the CPU 201 may display the selected screen on the RAM 207 by reading the control program that has been stored in the ROM 202 in advance on the RAM 207 and executing it (S611). FIG. 7 is an exemplification view showing a constitutional example of the selected screen and the selected screen is constituted so as to accept input of a user number as the identification data of itself, the registered number of the print data, the create date and time, and selection of a print method. The CPU 201 may accept the user number, the registered name and the create date and time of the print data by the operation of the accepting means 204 (S612). Input of the user number, the registered name, and the create date and time is not necessarily made by the operation of the accepting means 204, but they may be automatically inputted. As the above-described print method, there are two methods including "a normal print" and "registration of print data". Judging if "the normal print" is selected or not (S613), when it is determined that "the normal print" is not selected (S613: NO), the CPU 201 may transmit the print data and the data of indication of storage to the multifunctional machine 100 (S614). On the other hand, when it is determined that "the normal print" is selected (S613: YES), the CPU 201 may display a print condition setting screen on the display means 205 (S615). The print condition setting screen is constituted so as to set a sheet size of the sheet to be printed, designation of one side printing or both side printing, and a print condition such as designation of page layout printing or the like are set, and by input by the user, the CPU 201 may accept respective conditions of the page layout printing (S616). Next, the CPU 201 may transmit the print data and the print indicating data of this print data (S617).

Figure 8:
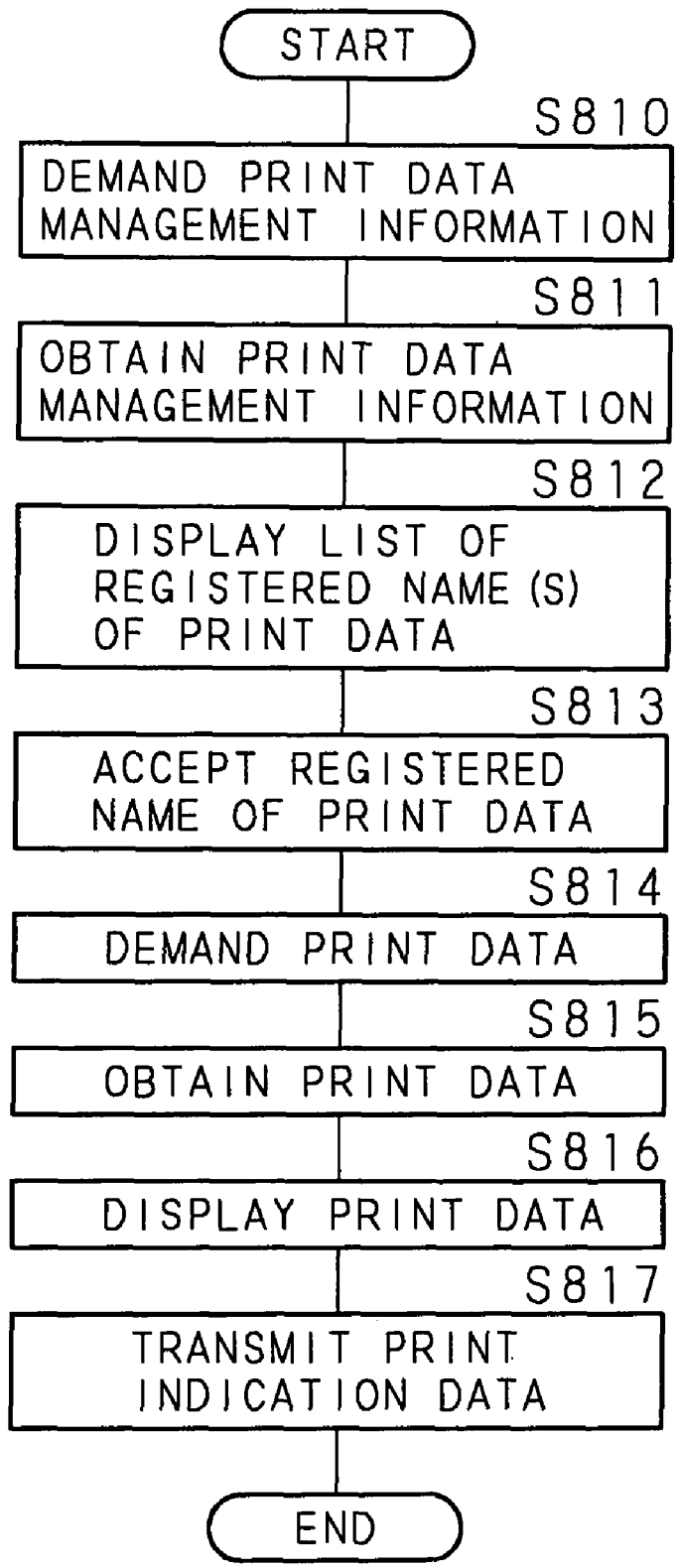
FIG. 8 is a flow chart showing processing that is carried out by one personal computer for indicating printing of the print data stored in a multifunctional machine by means of other personal computer.

In the case that the print data is stored in the multifunctional machine 100, other personal computers 200, 200 can indicate print of the print data. FIG. 8 is a flow chart showing processing that is carried out by one personal computer 200 for indicating printing of the print data stored in the multifunctional machine 100 by means of other personal computer 200. In order to select the print data that is an object of printing is selected from the print data stored in the multifunctional machine 100, the CPU 201 of one personal computer 200 may demand the information with respect to each folder and each print data stored in an HDD 103 of the multifunctional machine 100 (hereinafter, referred to as print data management information) for the multifunctional machine 100 (S810). Receiving demand of the print data management information, the multifunctional machine 100 may transmit the print data management information to one personal computer 200. Obtaining the print data management information that is transmitted from the multifunctional machine 100 (S811), the CPU 201 may display a list of the registered names of the print data stored by the multifunctional machine 100 on the basis of the print data management information on the display means 205 (S812). Then, the CPU 201 may accept the registered name of the print data that is the object of printing by the operation of the accepting means 204 of the user (S813). Next, the CPU 201 may demand the print data for the registered name with respect to the multifunctional machine 100 (S814). Receiving the demand of the print data, the multifunctional machine 100 may transmit this print data stored by the HDD 103 to one personal computer 200. When the print data is transmitted from the multifunctional machine 100, the CPU 201 may obtain this print data (S815) and may display this print data on the display means 205 (S816). Accepting a print instruction by the operation of the accepting means 204 of the user, the CPU 201 may transmit the print indicating data of the print data (S817). When the multifunctional machine 100 receives the print indicating data of the print data, the identification data of one personal computer 200 is written in the printer identification number column of the print data of the first management table and the print data is printed.

Figure 9A:
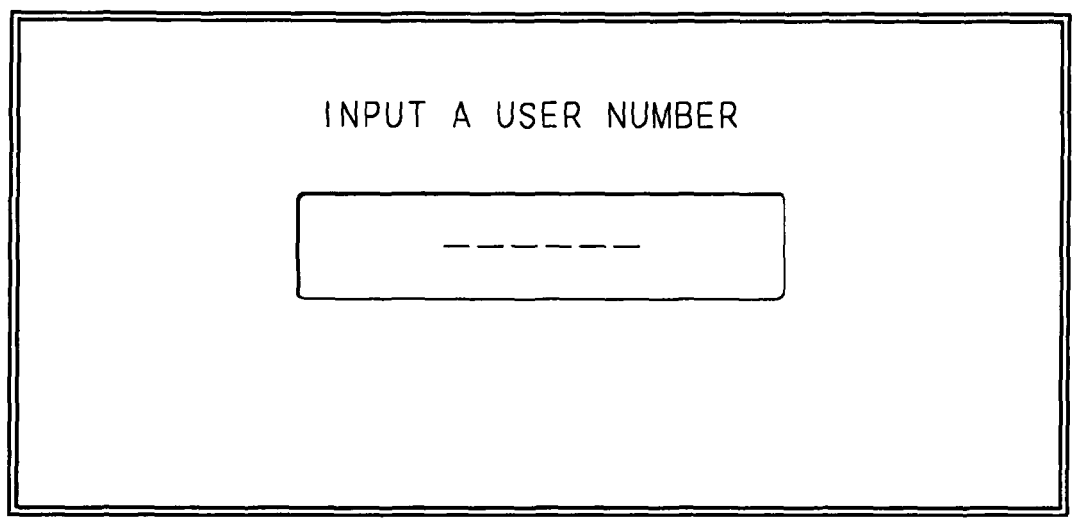
FIGS. 9A and 9B are exemplification views showing one example of a screen that is displayed on display means when the print indication is given by the operation of an operational panel.
Figure 9B:
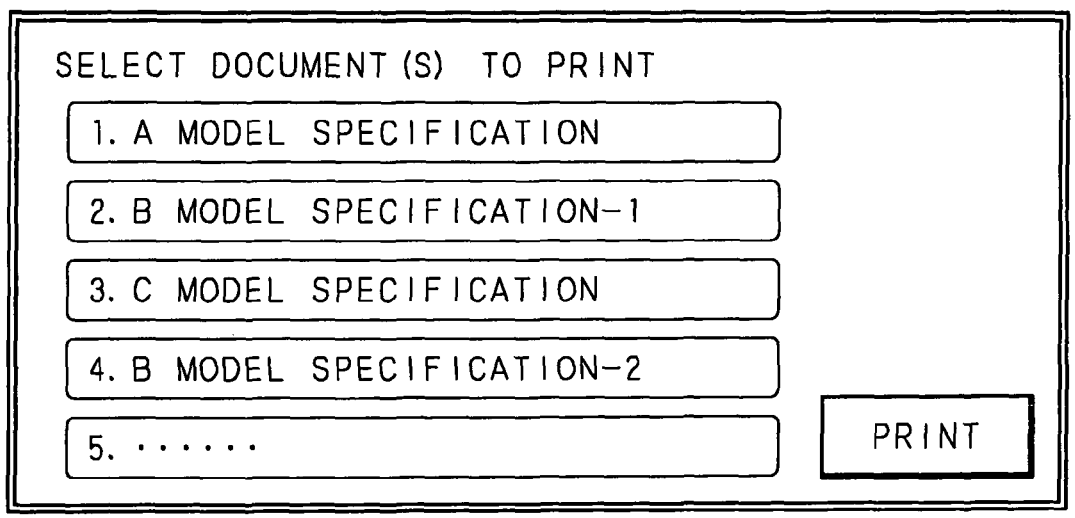

The print indication of the stored print data is not limited to the case of using the personal computers 200, 200, 200. FIG. 9 is an exemplification view showing one example of a screen that is displayed on a display means 105 when the print indication is given by the operation of an operational panel 104. When the operational panel 104 accepts predetermined operation, the screen inquiring the user number is displayed on the display means 105 (FIG. 9A). When accepting input of the user number due to the operation of the operational panel 104, a list of the stored print data is displayed on the display means 105 in order to accept selection of the print data to be printed (FIG. 9B), and by the operation of the operational panel 104, the data to be printed is selected. The accepted user number is written in the first management table. For example, when the user number is "111111" and "A model specification" is selected and printed, "111111" is written in the printer identification number column of "the A model specification" of the first management table and then, the column of the number of the printers is newly updated (FIG. 3B). The selected "A model specification" is printed on a paper and an OHP sheet or the like to be printed. In addition, the display means 105 may be made into a touch panel.

Figure 10A:
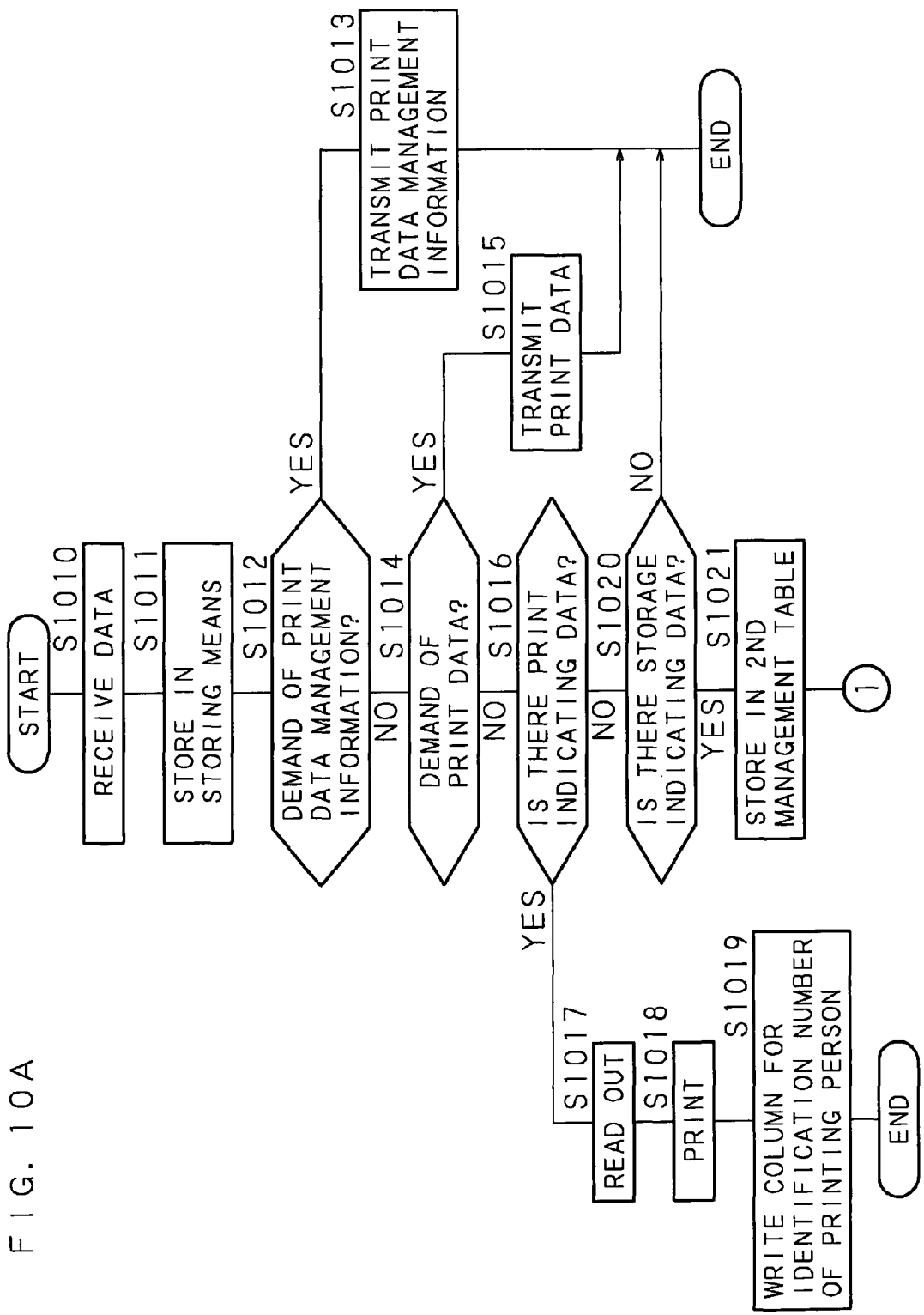
FIGS. 10A and 10B show a flow chart explaining a processing order of a CPU when receiving the data from the personal computer.
Figure 10B:
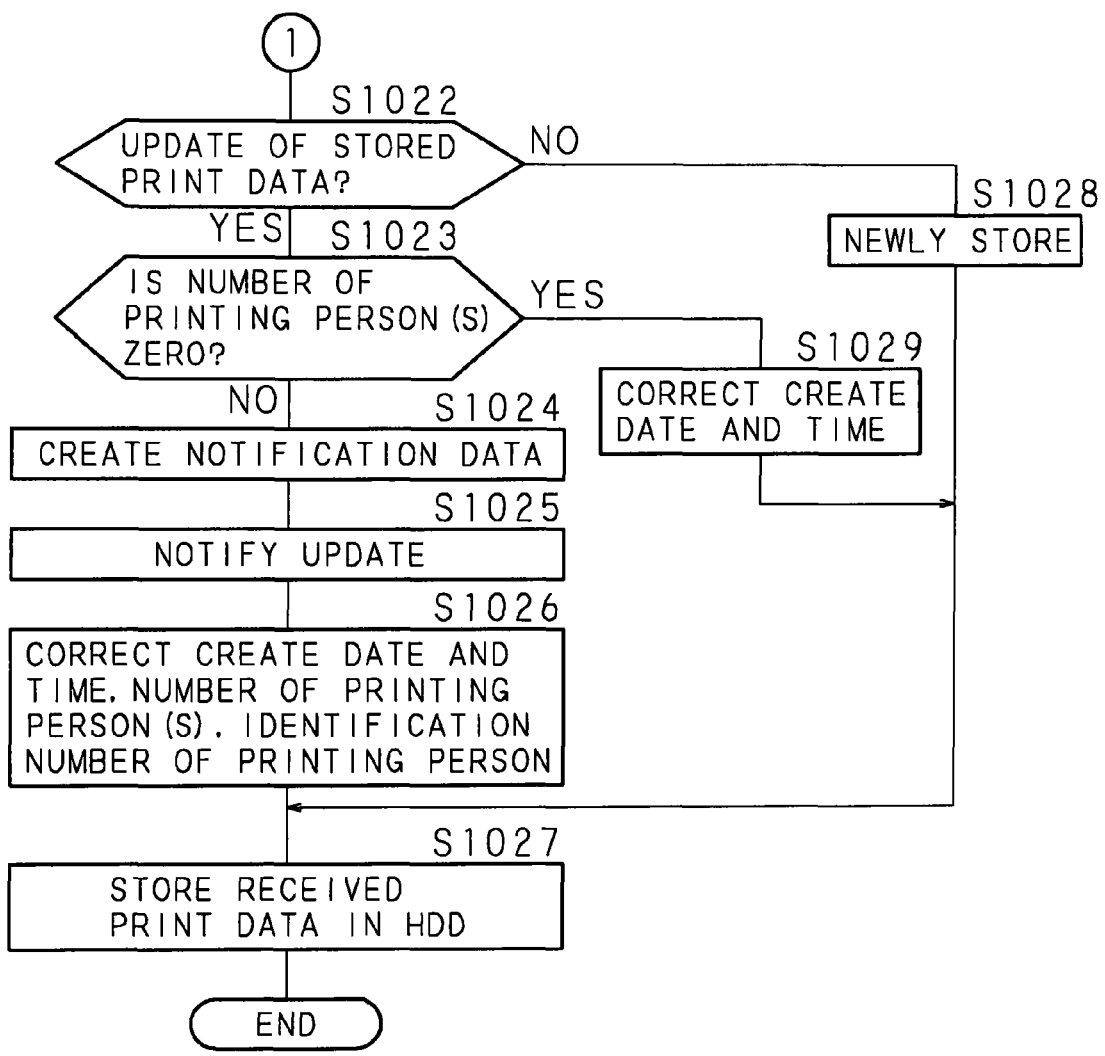

Hereinafter, the operation of the multifunctional machine 100 will be described. FIG. 10 is a flow chart explaining a processing order of the CPU 101 when receiving the data from the personal computers 200, 200, 200.

At first, the case of receiving the print indicating data from the personal computers 200, 200, 200 will be explained. For example, it is assumed that the print indicating data of "the A model specification" that is the stored print data is received from a personal computer 200, whose user number is "222222" (S1010). The CPU 101 may temporarily store the print data, the registered name and the create date and time and the data of the printer identification number of the print data, and the print indicating data in the storing means 110 (S1011). The CPU 101 may judge if there is a demand of the print data management information from the personal computers 200, 200, 200 (S1012). When there is a demand of the print data management information (S1012: YES), reading the print data management information from the HDD 103, the CPU 101 may transmit this print data management information to the personal computers 200 (S1013). When there is no demand of the print data management information (S1012: NO), the CPU 101 may judge if there is a demand of the print data or not (S1014). When there is a demand of the print data (S1014: YES), reading the print data according to the demand from the HDD 103, the CPU 101 may transmit this print data to the personal computers 200, 200, 200 (S1015). When there is no demand of the print data (S1014: NO), the CPU 101 may judge if there is the print indicating data or not (S1016). When judging that there is no demand of the print data (S1016: NO), CPU11 may proceed to S1020. When judging that there is a demand of the print data (S1016: YES), CPU11 may read the print indicating data of "the A model specification" from the HDD 103 (S1017), the CPU 101 may print the data on a paper and an OHP sheet or the like (S1018). Next, the CPU 101 may write the user number "222222" in the printer identification number column of the "A model specification" of the first management table (S1019).

Next, the case of receiving the storage indicating data from the personal computers 200, 200, 200 will be described. For example, it is assumed that the print data, whose registered name and create date and time are "A model specification" and "2006/3/8/12:00:00" respectively, and the storage indicating data of this print data are received from the personal computer 200 having the user number of "111111" (S1010). The CPU 101 may temporarily store the print data, the registered name, the crate data and time, and the data of the recorder identification number of this print data in the storing means 110 (S1011). Next, the CPU 101 may judge if there is a demand of the print data management information or not (S1012). In the case that there is a demand of the print data management information (S1012: YES), the CPU 101 may proceed to S1013. In the case that there is no demand of the print data management information (S1012: NO), the CPU 101 may judge if there is a demand of the print data or not (S1014). In the case that there is a demand of the print data (S1014: YES), the CPU 101 may proceed to S1015. In the case that there is no demand of the print data (S1014: NO), the CPU 101 may judge if there is the print indicating data or not (S1016). When the CPU 101 judges that there is the print indicating data (S1016: YES), the CPU 101 may proceed to S1017. When the CPU 101 judges that there is no print indicating data (S1016: NO), the CPU 101 may judge if there is the storage indicating data or not (S1020). When the CPU 101 judges that there is no storage indicating data (S1020: NO), the CPU 101 may terminate the processing. When the CPU 101 judges that there is the storage indicating data (S1020: YES), the CPU 101 may write the registered name, the create data and time, and the recorder identification number in the second management table on the basis of the data stored in the storing means as shown in FIG. 4B (S1021).

Next, the CPU 101 may judge if the received print data is obtained by updating the stored print data or not (S1022). This judgment may be performed by comparing the registered name and the recorder identification number of the second management table with the first management table. In the case that the registered name and the recorder identification number of the second management table is identical with any of the registered name and the recorder identification number of the stored print data written in the first management table, the CPU 101 may judge that the received print data is obtained by updating the stored print data (S1022: YES). In this case, the CPU 101 may judge if the number of printer according to the stored print data is 0 or not in the first management table (S1023). When the number of printer is not 0 (S1023: NO), the CPU 101 may create the registered name and a new create date and time of the updated stored print data, namely, notification data including the date of update on the basis of the second management table (S1024). Next, the CPU 101 may transmit the created notification data to each personal computer 200 according to each printer identification number of the stored print data stored in the first management table as a transmission destination via the communication I/F 106 to notify update of the stored print data (S1025). FIG. 18A shows an example of a screen to be displayed on the display means 205 of the personal computers 200, 200, 200 in response to this notification. On this screen, it is displayed that the updated stored print data is "the A model specification" and a new create date and time is "2006/3/8/12:00:00". The notification is sent by using, for example, a mail or a pop-up display. Next, the CPU 101 may correct the create date and time, the number of printer, and the printer identification number of the first management table (S1026). In other words, rewriting the create date and time of the stored print data according to the update into a create date and time of the received print data, the number of printer is made into 0 and all of the printer identification numbers are deleted (FIG. 3C). In S1022, when judging that the received print data is not obtained by updating the stored print data (S1022: NO), the CPU 101 may newly store the print data without sending the notification (S1028). In other words, the CPU 101 may write a new management number, a new registered name of the received print data, a new create date and time, and a new recorder identification number in the first management table. In addition, when judging that the number of printer is 0 in S1023 (S1021: YES), without sending the notification, the CPU 101 may correct only the create date and time of the stored print data of the first management table into the create date and time of the received print data (S1029). Next, the CPU 101 may store the received print data in the HDD 103 (S1027). When the received print data is obtained not by updating the stored print data, the data becomes newly stored data and when the received print data is obtained by updating the stored print data, the data is made into so-called overwritten data.

Second Embodiment

Figure 11:
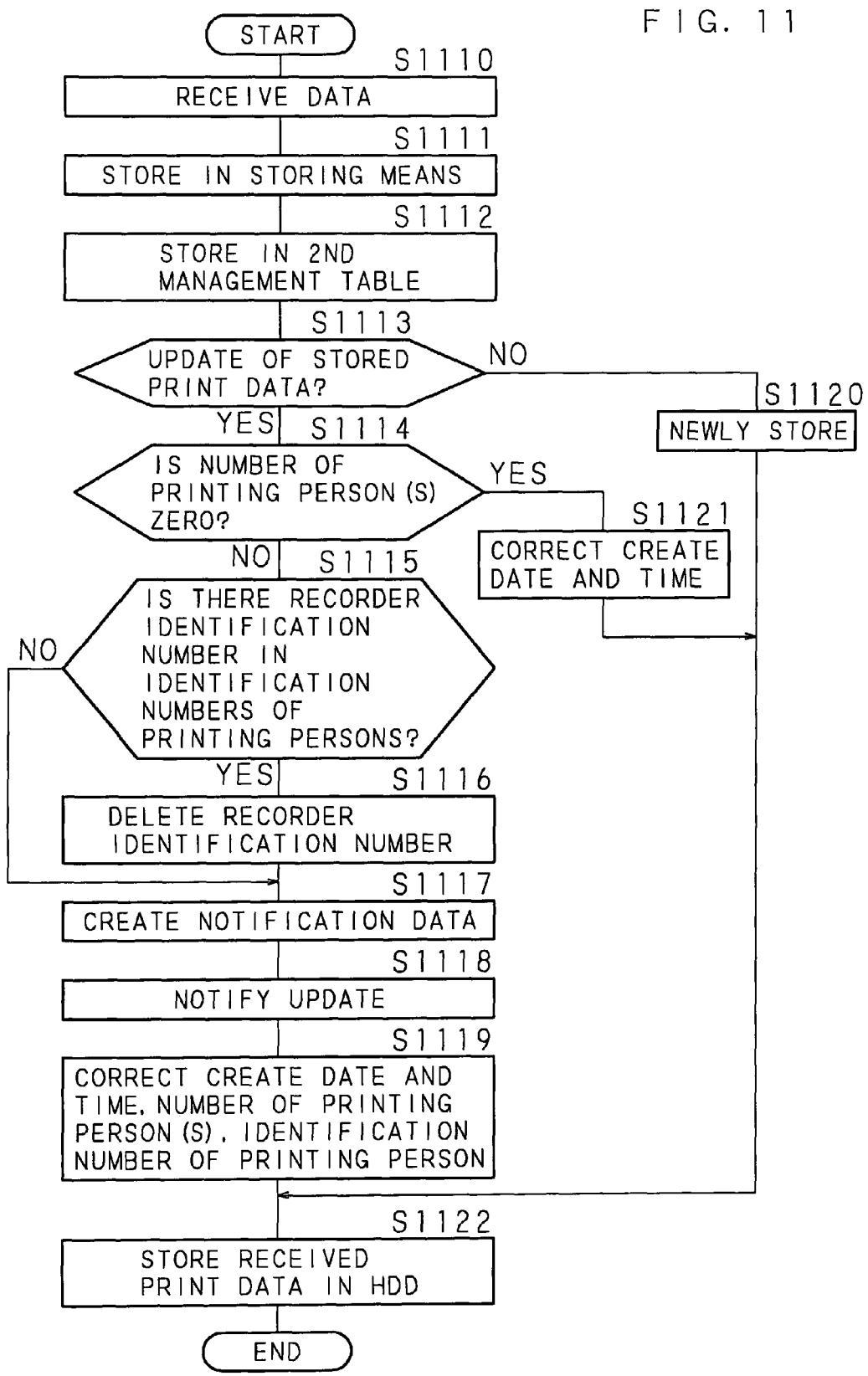
FIG. 11 is a flow chart explaining a processing order of a CPU according to a second embodiment.

FIG. 11 is a flow chart explaining a processing order of the CPU 101 according to a second embodiment. Hereinafter, the second embodiment will be explained focusing on the case of receiving the print data and the storage indicating data of this print data according to update of the stored print data.

For example, the stored print data "A model specification" stored by the multifunctional machine 100 has been printed due to the print indicating data from the personal computers 200, 200 whose user numbers are "111111" and "222222", respectively, in the former case (FIG. 3D), ad in this time, the print data and the storage indicating data of this print data whose registered name and create date and time are "A model specification" and "2006/3/8/12:00:00", respectively are assumed to be received from the personal computer 200 of which user number is "111111" (S1110). The CPU 101 may temporarily store the print data, the registered name and the create date and time and the data of the recorder identification number of the print data, and the print indicating data in the storing means 110 (S1111). The CPU 101 may write the registered name, the create date and time, and the recorder identification number of the received print data in the second management table on the basis of the data stored by the storing means 110 as shown in FIG. 4B (S1112). Next, the CPU 101 may judge if the received print data is obtained by updating the stored print data or not (S1113). In the case that the CPU 101 judges that the received print data is obtained by updating the stored print data (S1113: YES), the CPU 101 may judge if the number of printer according to the stored print data is 0 or not (S1114). When the number of printer according to the stored print data is not 0 (S1114: NO), the CPU 101 may judge if the recorder identification number of the received print data of the second management table is included in the printer identification number of the stored print data of the first management table or not (S1115). If the CPU 101 judges that there is no received print data of the second management table is included therein (S1115: NO), the CPU 101 may proceed to S1117. If the CPU 101 judges that there is the received print data of the second management table is included therein (S1115: YES), the CPU 101 may delete the recorder identification number of the received print data from among the printer identification numbers of the stored print data of the first management table (S1116), and then, the CPU 101 may rewrite the number of printer in response to this deletion (FIG. 3E).

The CPU 101 may create notification data including a registered name and a new create date and time of the updated stored print data on the basis of the second management table (S1117). Next, the CPU 101 may transmit the created notification data to each personal computer 200 according to each printer identification number of the stored print data stored in the first management table as a transmission destination to notify update of the stored print data (S1118). Next, the CPU 101 may correct the create date and time, the number of printer, and the printer identification number of the first management table (S1119). On the other hand, when the received print data is judged not to be obtained by updating the stored print data in S1113 (S1113: NO), without sending the notification, the CPU 101 may newly store the data (S1120). In addition, when the number of printer is judged to be 0 (S114: YES), without sending the notification, the CPU 101 may correct only the create date and time of the stored print data of the first management table into the create date and time of the received print data (S1121). Next, the CPU 101 may store the received print data in the HDD 103 (S1122).

According to the second embodiment, the case including a step for deleting the recorder identification number of the print data from among the printer identification numbers of the stored print data written in the first management table in order to prevent wasteful notification to the personal computer 200 indicating storage of the print data according to update of the stored print data in the notification of the update of the stored print data, however, the present embodiment is not limited to this case. For example, in the case of printing the data depending on the print indicating data from the personal computer 200 having the user number that is identical with the recorder identification number of the stored print data, preventing to update the printer identification number of the first management table and the number of printer, the present embodiment may be constituted so as to proceed to a next step without taking the above-described step.

With respect to the same parts as the first embodiment, the same reference numerals are given to them and the detailed explanations are herein omitted.

Third Embodiment

The print data processing system according to the third embodiment can notify a matter to be notified together with a notification of update of the stored print data (hereinafter, referred to as a message) of other personal computers 200, 200 to which printing of the stored print data is indicated by one personal computer 200 that updates the stored print data.

Figure 12A:
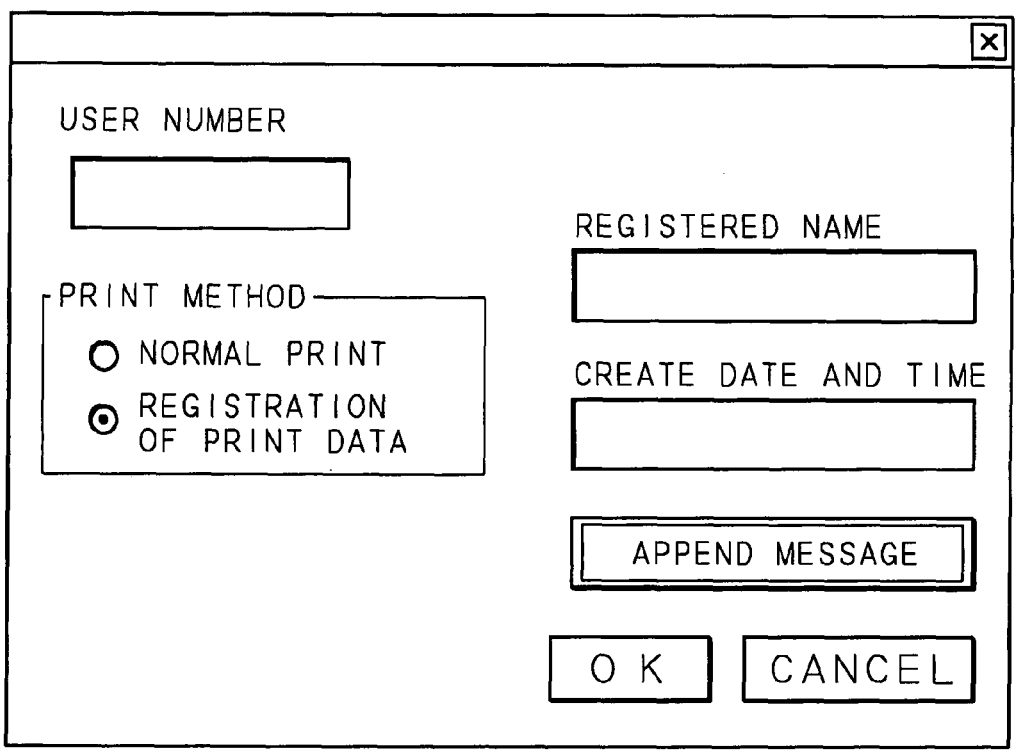
FIGS. 12A and 12B are exemplification views showing one example of an image of a personal computer to receive a message in a print data processing system according to a third embodiment.
Figure 12B:
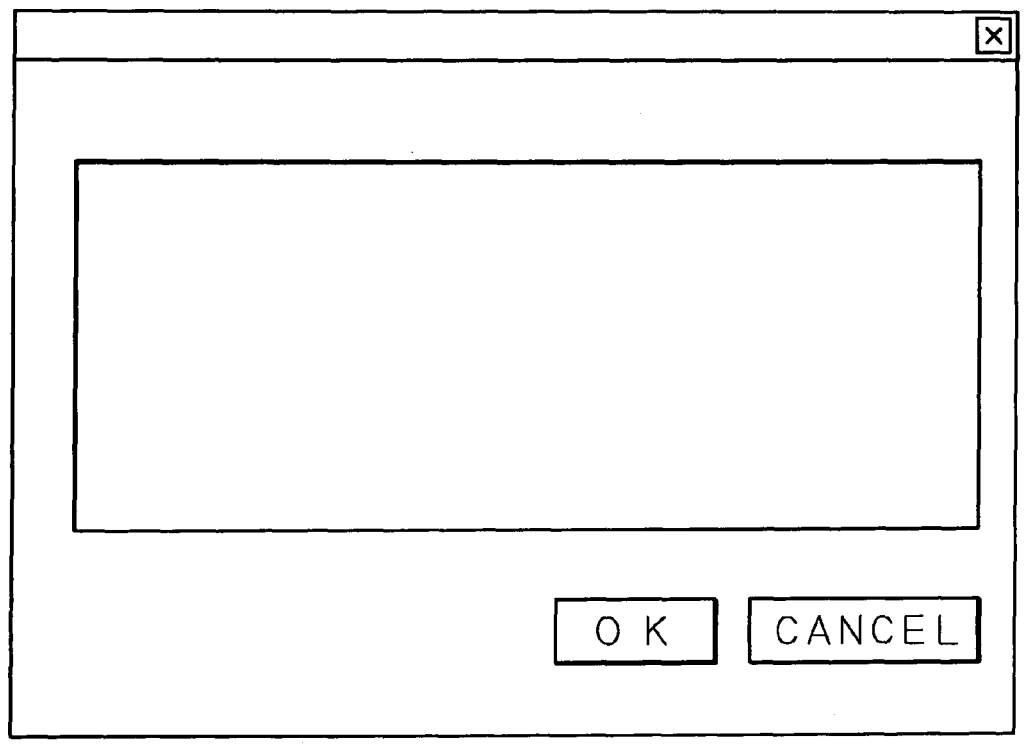

FIGS. 12A and 12B are exemplification views showing one example of an image of the personal computers 200 to receive a message. FIG. 12A shows an image displayed by the display means 205 when the one personal computer 200 creates the print data according to update of the stored print data and indicates the multifunctional machine 100 to print or store the print data. This screen is constituted so as to accept input of the user number, the registered name of the print data, and the create date and time, setting of the print method, and selection if a message should be added or not. Only in the case of setting the print method at "register the print data", the selection if the message should be added or not is available. By pressing a button of "adding a message", to add the message is selected, and on the display means 205, the screen for accepting the message is displayed (FIG. 12B). The message is inputted by the operation of the accepting means 204 and by pressing an OK button, this message is added to the print data.

Figure 13A:
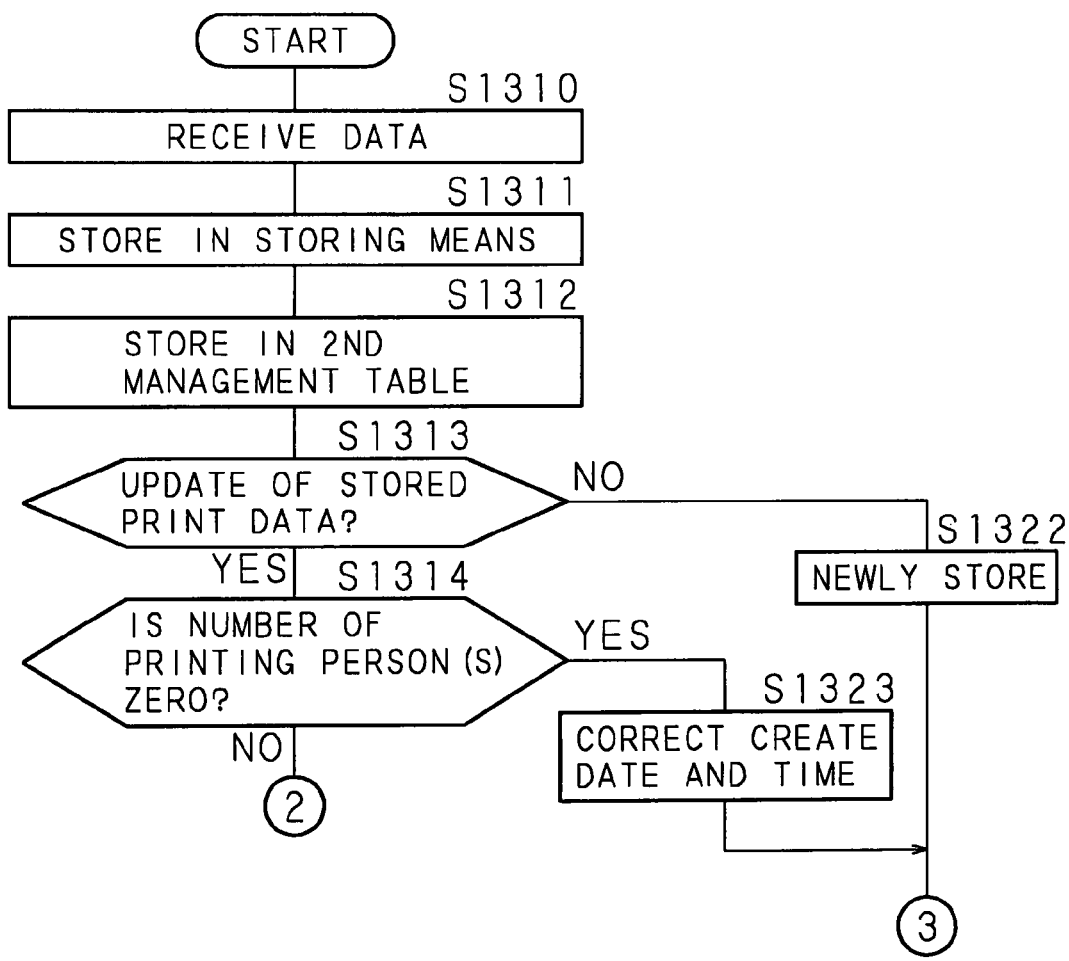
FIGS. 13A and 13B show a flow chart for explaining a processing order of a CPU according to the third embodiment.
Figure 13B:
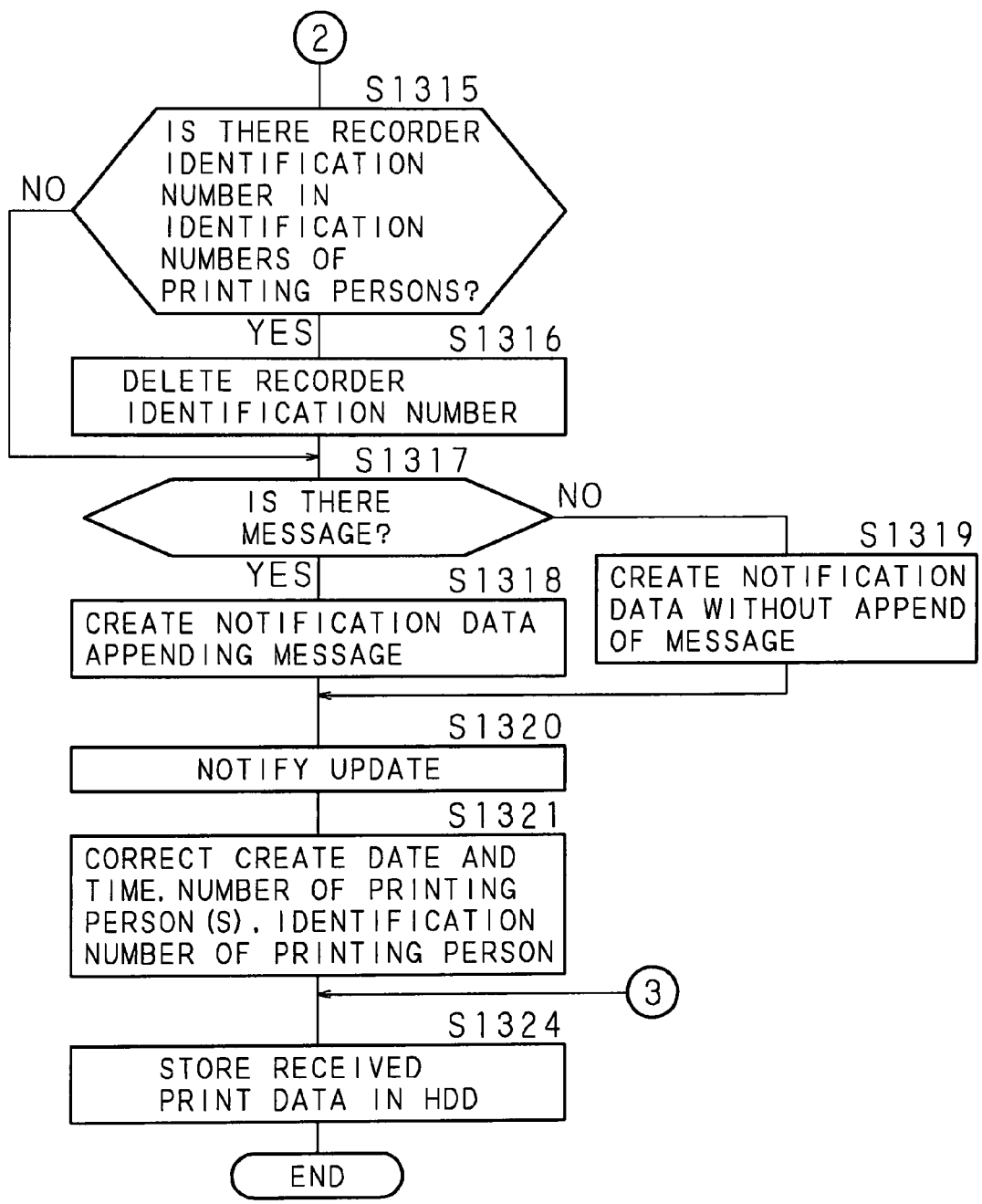

FIG. 13 is a flow chart for explaining a processing order of the CPU 101 according to the third embodiment.

For example, it is assumed that the print data, to which the registered name, the create date and time, and the data of the message are attached, and storage indicating data of this print data are received (S1310). The CPU 101 may temporarily store the print data, the registered name, the create date and time, and the recorder identification number of the print data, the data of the message, and the storage indicating data in the storing means 110 (S1311). The CPU 101 may write the registered name, the create date and time, and the recorder identification number of the received print data in the second management table on the basis of the data stored by the storing means 110 (S1312).

Next, the CPU 101 may judge if the received print data is obtained by updating the stored print data or not (S1313). When the CPU 101 judges that the received print data is obtained by updating the stored print data (S1313: YES), the CPU 101 may judge if the number of printer according to the stored print data is 0 or not in the first management table (S1314). When the number of printer is not 0 (S1314: NO), the CPU 101 may judge if the recorder identification number of the received print data of the second management table is included or not in the printer identification numbers of the stored print data of the first management table (S1315). When the CPU 101 judges that recorder identification number of the received print data of the second management table is not included (S1315: NO), the CPU 101 may proceed to S1317. When the CPU 101 judges that recorder identification number of the received print data of the second management table is included (S1315: YES), the CPU 101 may delete the recorder identification number of the received print data from among the printer identification numbers of the stored print data of the first management table (S1316) to rewrite the number of printer in response to the deletion. Next, the CPU 101 may judge if the message is attached or not (S1317). In the case that the CPU 101 judges that the message is not attached (S1317: NO), the CPU 101 may create notification data including the registered name and a new create date and time of the updated stored print data having no message added on the basis of the second management table (S1319). When the CPU 101 judges that the message is added (S1317: YES), the CPU 101 may create notification data adding the message to the registered name and the new create date and time of the updated stored print data (S1318). The CPU 101 may transmit the notification data created in S1318 and S1319 defining each personal computer 200 according to each printer identification number of the stored print data that is stored in the first management table as a transmission destination and may notify the computer of the update of the stored print data (S1320).

FIG. 18B shows an example of a screen that is displayed on the display means 205 of the personal computers 200, 200, 200 in response to the notification. On this screen, the registered name and the create date and time of the updated stored print data and the message are displayed. Next, the CPU 101 may correct the create date and time, the number of printers, and the printer identification number of the first management table (S1321). On the other hand, in the case of judging that the received print data is not obtained by updating the stored print data in S1313 (S1313: NO), without giving the notification, the data is newly stored (S1322). In addition, when the CPU 101 judges that the number of printer according to the stored print data is 0 (S1314: YES), without giving the notification, the CPU 101 may correct only the created date and time of the stored print data of the first management table into the created date and time of the received print data (S1323). Next, the CPU 101 may store the received print data in the HDD 103 (S1324).

With respect to the same parts as the first and second embodiments, the same reference numerals are given to them and the detailed explanations are herein omitted.

Fourth Embodiment

Depending on the case, the stored print data may be updated when it is not needed. For example, this may happen when the stored print data is printed very seldom and further, the next update following the update of this time is scheduled to be on a next day of a day when the data is created. A print data processing system according to the fourth embodiment can set if the update of the stored print data should be notified or not from the personal computer 200 creating the print data according to the update of the stored print data.

Figure 14:
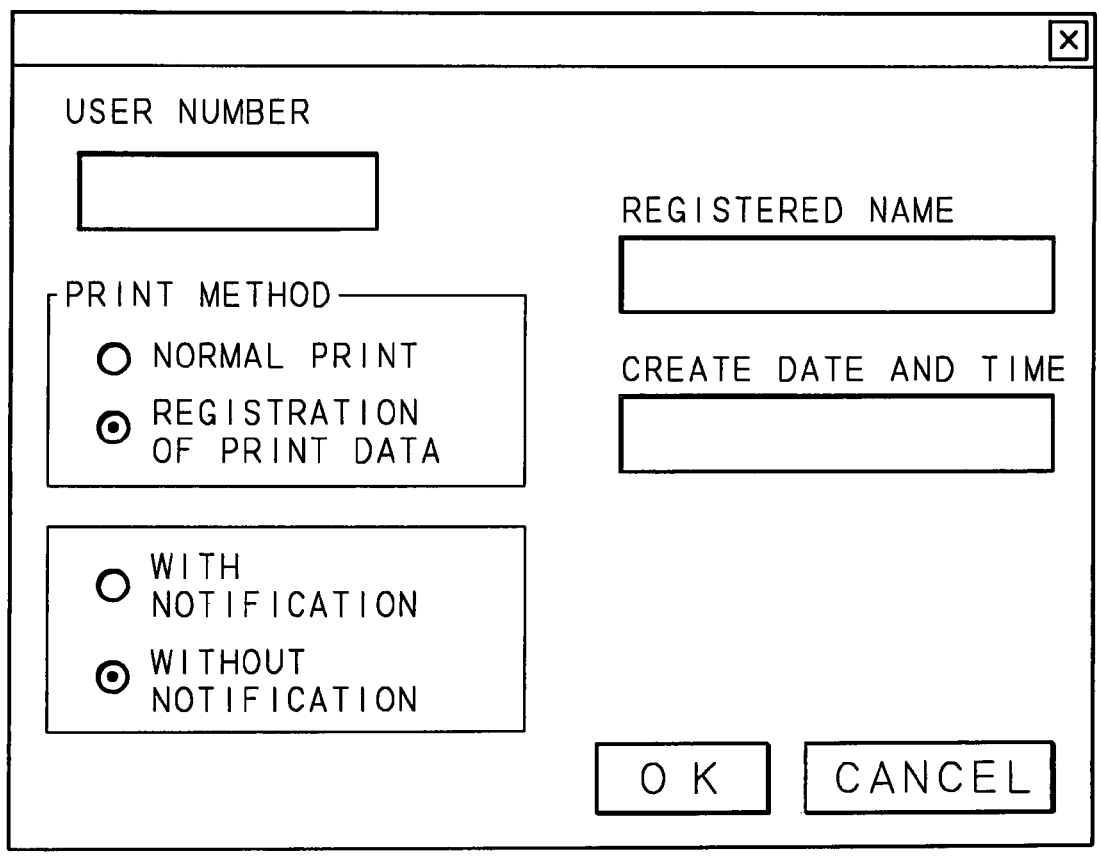
FIG. 14 is an exemplification view showing an example of an image that is displayed by the display means when the personal computer creates print data for update of the stored print data and indicates the multifunctional machine to print the print data or store the print data in a print data processing system according to a forth embodiment.

FIG. 14 is an exemplification view showing an example of an image that is displayed by the display means when the personal computers 200, 200, 200 create print data for update of the stored print data and indicates the multifunctional machine 100 to print the print data or store the print data. This screen is constituted so as to accept input of a user number the registered number of the print data, the create date and time, setting of the print method, and selection if the notification should be given or not. This screen is constituted so that whether or not the notification should be given can be selected only when the print method is set at "register print data". The selection if the notification should be given or not has two selection conditions, namely, "should be notified" and "should be notified". When "should be notified" is selected or "should not be notified" is not selected, the data for indicating notification according to each selection is added to the print data.

Figure 15A:
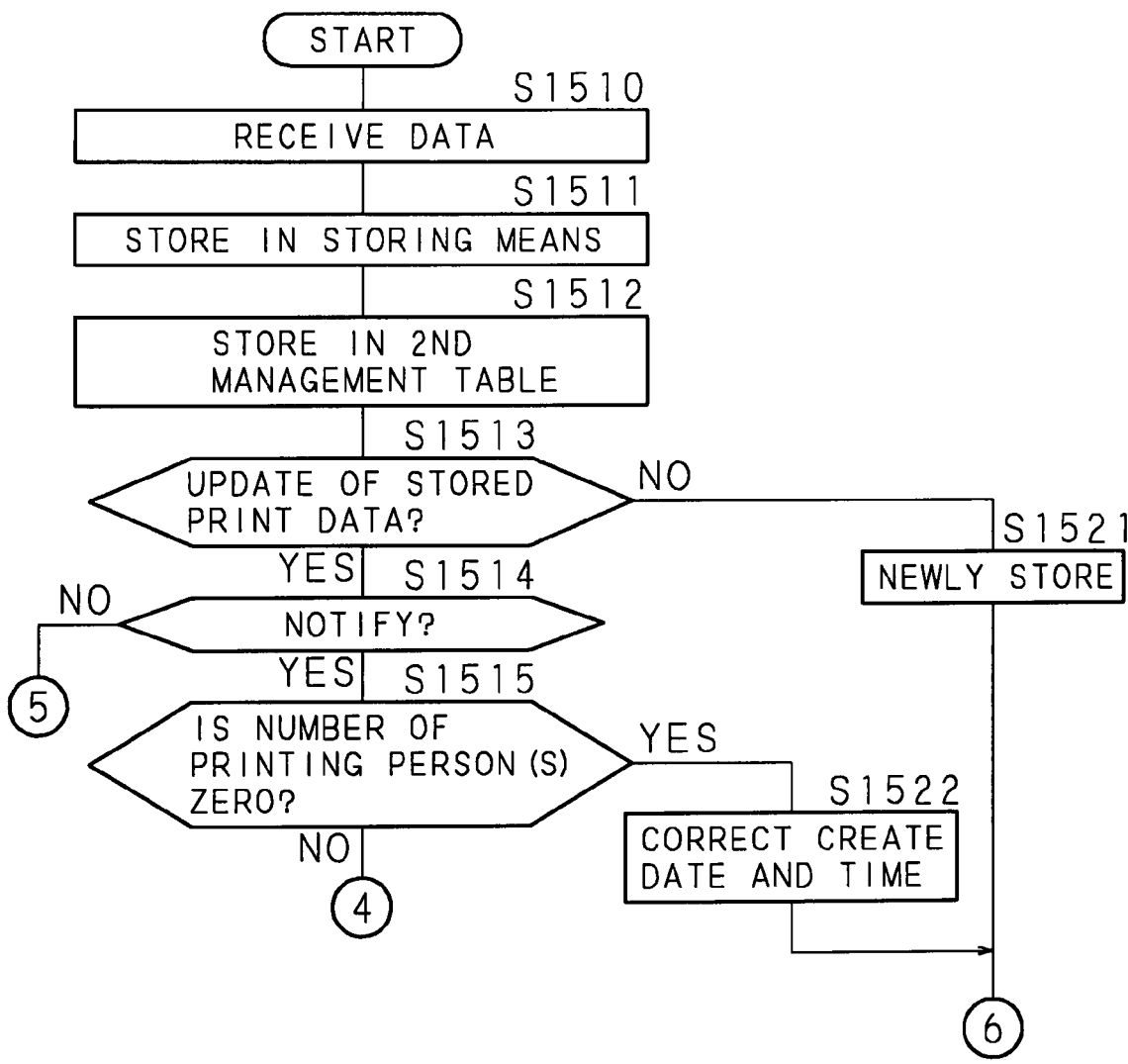
FIGS. 15A and 15B show a flow chart for explaining a processing order of a CPU according to a forth embodiment.
Figure 15B:
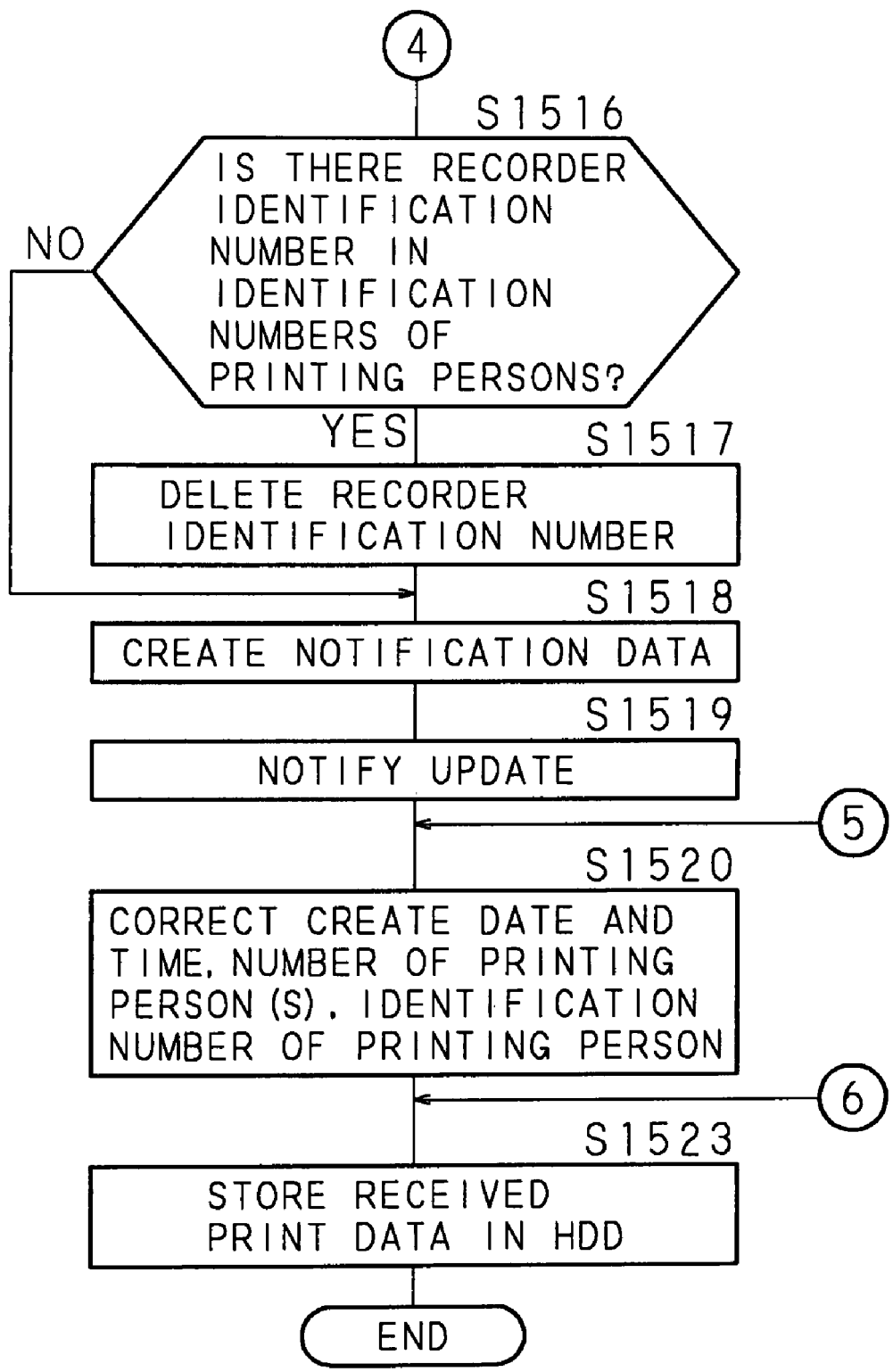

FIG. 15 is a flow chart for explaining a processing order of the CPU 101 according to the forth embodiment.

For example, it is assumed that the registered name, the create date and time, the recorder identification number, the print data to which the data of notification indication is added, and the storage indicating data of this print data are received (S1510). The CPU 101 may temporarily store the print data, the registered name, the create date and time, the recorder identification number, and the storage indicating data of this print data in the storing means 110 (S1511). The CPU 101 may write the registered name, the create date and time, and the recorder identification number of the received print data in the second management table on the basis of the data stored in the storing means (S1512).

Next, the CPU 101 may judge if the received print data is obtained by updating the stored print data or not (S1513). In the case that the CPU 101 judges that the received print data is obtained by updating the stored print data (S1513: YES), the CPU 101 may judge if the CPU 101 should notify the computer of this on the basis of the notification indicating data or not (S1514). When the CPU 101 judges that it should not notify this (S1514: NO), the CPU 101 may proceed to S1520. When the CPU 101 judges that it should notify this (S1514: YES), the CPU 101 may judge if the number of printer according to the stored print data is 0 or not in the first management table (S1515). When the number of printer according to the stored print data is not 0 (S1515: NO), the CPU 101 may judge if the recorder identification number of the received print data of the second management table is included among the printer identification numbers of the stored print data of the first management table or not (S1516). When the CPU 101 judges if the recorder identification number of the received print data of the second management table is not included therein (S1516: NO), the CPU 101 may proceed to S1518. When the CPU 101 judges that it is included therein (S1516: YES), the CPU 101 may delete the recorder identification number of the received print data from among the printer identification numbers of the stored print data of the first management table or not (S1517) so as to rewrite the number of printer in response to this deletion. The CPU 101 may create the notification data including a registered name and a new create date and time of the updated stored print data (S1518) on the basis of the second management table.

Next, the CPU 101 may transmit the created notification data to each personal computer 200 according to each printer identification number of the stored print data stored in the first management table as a transmission destination so as to notify the computer of the update of the stored print data (S1519). Next, the CPU 101 may correct the create date and time, the number of printer, and the printer identification number of the first management table (S1520). On the other hand, when the CPU 101 judges that the received print data is not obtained by updating the stored print data in S1513 (S1513: NO), without giving the notification, the CPU 101 may newly store the data (S1521). In addition, when the CPU 101 judges that it is 0 in S1515 (S1515: YES), without giving the notification, the CPU 101 may correct only the create date and time of the stored print data of the first management table into the create date and time of the received print data (S1522). Next, the CPU 101 may store the received print data in the HDD 103 (S1523).

With respect to the same parts as the first to third embodiments, the same reference numerals are given to them and the detailed explanations are herein omitted.

Fifth Embodiment

In the case that update of a plurality of stored print data is carried out, it is necessary to notify the personal computers 200, 200, 200 according to the printer identification number of each stored print data of update of the stored print data in plural number of times. Therefore, a print data processing system according to the fifth embodiment is constituted so as to collectively notify the computer of the update of a plurality of stored print data.

Figure 16:
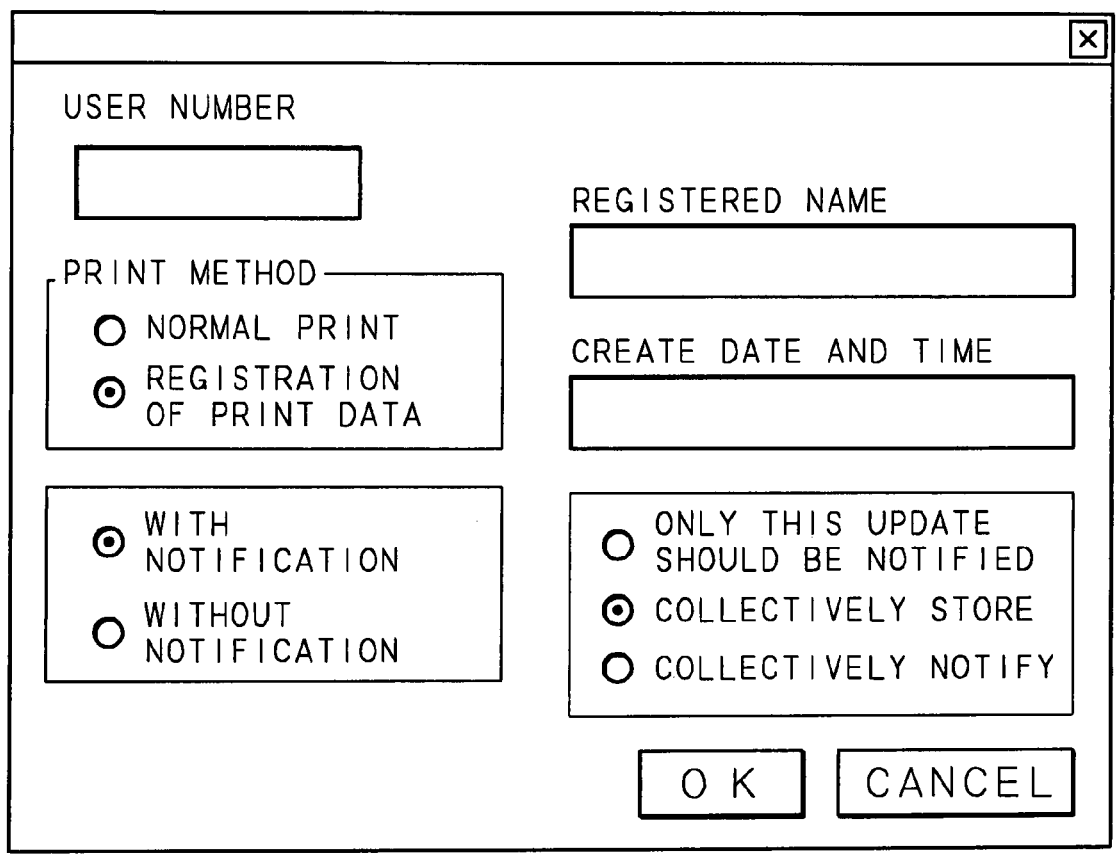
FIG. 16 is an exemplification view showing an example of an image that is displayed by the display means when the personal computer creates print data for update of the stored print data and indicates the multifunctional machine to print the print data or store the print data in a print data processing system according to a fifth embodiment.

FIG. 16 is an exemplification view showing an example of an image that is displayed by the display means 205 when the personal computers 200, 200, 200 create print data for update of the stored print data and indicates the multifunctional machine 100 to print the print data or store the print data. This screen is constituted so as to accept input of a user number, the registered number of the print data, the create date and time, setting of a print method, selection if a notification should be given or not, and selection if the notifications are collectively given or not. Only in the case of setting the print method at "print data should be registered", whether or not the notifications are collectively given can be selected, and only in the case of setting the print method at "a notification should be given", whether or not a notification should be given can be selected. Whether or not the notifications are collectively given is selected by selecting any one from among "only this update should be notified", "collectively store", and "collectively notify", and the data according to each selection (hereinafter, this is referred to as data of batch notification) is attached to the print data. For example, when "only this update should be notified" is selected and the multifunctional machine 100 receives the print data to which the data of the batch notification is attached, the CPU 101 may only give the notification for update of the print data. When "collectively store" is selected and the multifunctional machine 100 receives the print data to which the batch notification data for this selection, the CPU 101 may write the printer identification number and the management number of the stored print data according to the print data in the third management table. When "collectively notify" is selected and the multifunctional machine 100 receives the print data having the batch notification data according to this selection attached, the CPU 101 may write the printer identification number and the management number of the stored print data according to the print data in the third management table, and next, the CPU 101 may notify respective personal computers 200, 200, 200 of update on the basis of each printer identification number written in the third management table.

Figure 17A:
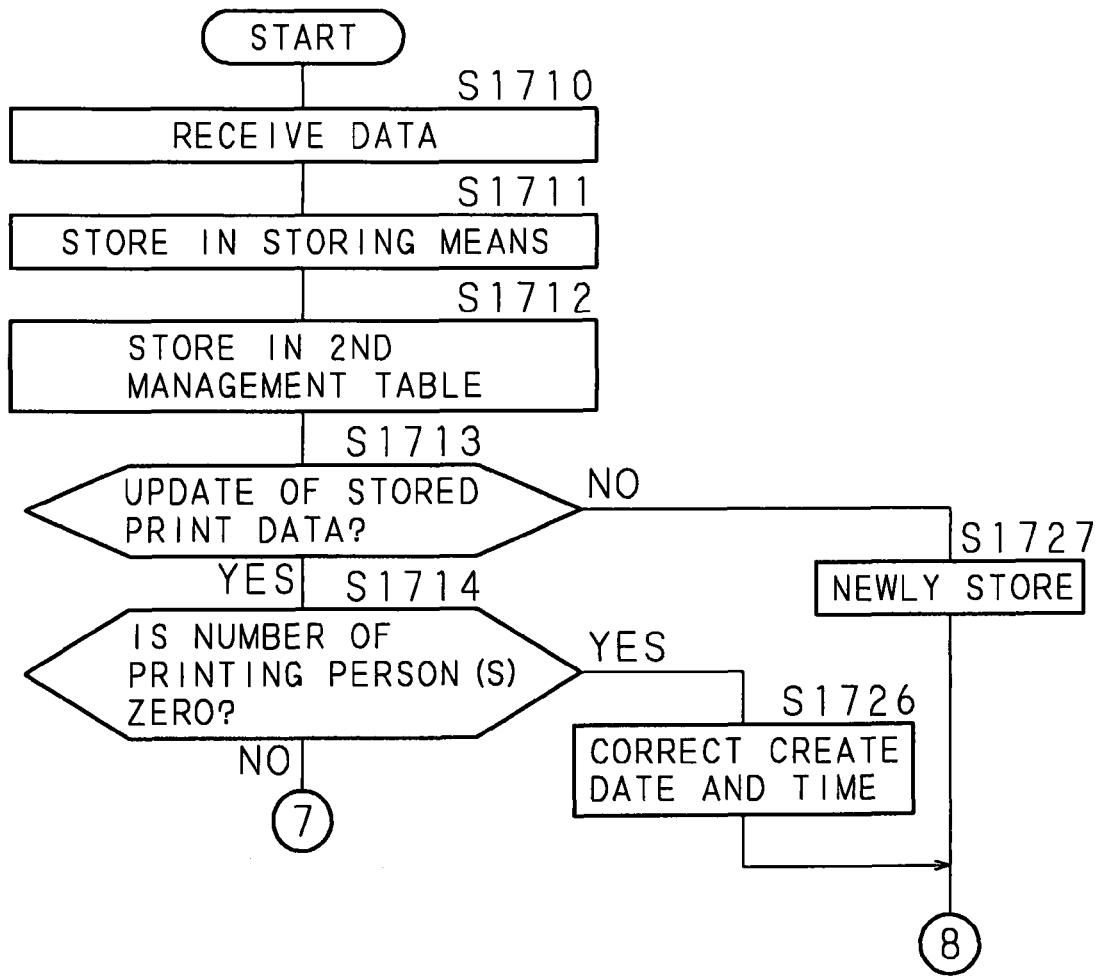

FIG. 17 is a flow chart for explaining a processing order of a CPU according to the fifth embodiment.

For example, it is assumed that the CPU 101 receives the print data, to which the data of the batch notification according to the "collectively store" is attached, and the storage indicating data of this print data (S1710). The CPU 101 may temporarily store the print data, the registered name, the create date and time, the recorder identification number of the print data, the data of the batch notification, and the indicating data in the storing means 110 (S1711). The print data is related to update of the stored print data, and the registered name, the create date and time, and the recorder identification number of the print data are "B model specification-1", "2006/3/8/17:40:00", and "222222", respectively. As shown in FIG. 4C, the CPU 101 may write the registered name, the create date and time, and the recorder identification number of the received print data in the second management table on the basis of the data stored in the storing means (S1712). Next, the CPU 101 may judge if the received print data is obtained by updating the stored print data or not (S1713). When the CPU 101 judges that the received print data is obtained by updating the stored print data (S1713: YES), the CPU 101 may judge if the number of printer according to the stored print data is 0 or not in the first management table (S1714). In the case that the number of printer according to the stored print data is not 0 (S1714: NO), the CPU 101 may judge if the data of batch notification according to "only this update should be notified" is attached to the received print data or not (S1715). When the CPU 101 judges that the data of batch notification according to "only this update should be notified" is attached thereto (S1715: YES), the CPU 101 may create notification data including the registered name and a new create date and time of the updated stored print data (S1716) on the basis of the second management table. Next, the CPU 101 may transmit the created notification data to each personal computer 200 according to each printer identification number of the stored print data stored in the first management table as a transmission destination to notify update of the stored print data (S1717). Next, the CPU 101 may correct the create date and time, the number of printer, and the printer identification number of the first management table (S1718).

On the other hand, in S1715, when the CPU 101 judges that the data of batch notification according to "only this update should be notified" is not attached thereto (S1715: NO), the CPU 101 may collectively record the management number and each printer identification number of the stored print data according to the received print data in the third management table on the basis of the data of the first management table (S1720). In the third management table, the management numbers of the stored print data are written for each printer identification number and an example of this is shown in FIG. 5A. Next, the CPU 101 may update the create date and time of the stored print data of the first management table on the basis of the data of the first management table (S1721). Next, the CPU 101 may judge whether or not the data of batch notification according to "collectively notify" is attached to the received print data (S1722). When the CPU 101 judges that the data of batch notification according to "collectively notify" is attached to the received print data (S1722: YES), the CPU 101 may store the received print data in the HDD 103 (S1719) so as to terminate the processing. In this case, since the data of batch notification according to the "collectively store" is attached to the received print data, without giving the update notification, the processing ends here.

Hereinafter, taking the case that new print data is received following the received print data as an example, the processing in the case that the CPU 101 judges that the data of batch notification according to the "collectively store" is not attached to the received print data (S1722: NO) will be described. New received print data is related to update of the stored print data and the data of batch notification according to "collectively notify" is attached thereto. The registered name, the create date and time, and the recorder identification number of the print data are "B model specification-2", "2006/3/8/17:45:00", and "222222", respectively, and the CPU 101 may temporarily store new print data, a new registered name of the print data, a create date and time, a recorder identification number, the data of batch notification, and print indicating data in the storing means 110 (S1711). As shown in FIG. 4D, the CPU 101 may write the registered name, the create date and time, and the recorder identification number of the received print data in the second management table on the basis of the data stored in the storing means (S1712).

Next, the CPU 101 may carry out the same processing as the received print data to new received print data, and as shown in FIG. 5B, in S1720, the CPU 101 may store the printer identification number and the management number of the store print data according to new received print data in the third management table on the basis of the data of the first management table. However, as shown in FIG. 3E, the printer identification number of the stored print data according to new received print data is identical with the stored print data according to the received print data, so that without addition of the printer identification number, the management number of the stored print data according to new received print data is added for each printer identification number. Next, the CPU 101 may update the create date and time of the stored print data of the first management table on the basis of the data of the second management table (S1721). Next, the CPU 101 may judge if the data of batch notification according to "collectively notify" is attached to the received print data or not (S1722). Since the data of batch notification according to "collectively notify" is attached to the new received print data, the CPU 101 may judge that the data of batch notification according to "collectively notify" is not attached thereto (S1722: NO). The CPU 101 may create data of batch notification including a registered name and a new create date and time of each of updated stored print data on the basis of the third management table and the first management table (S1723). Next, the CPU 101 may transmit the created notification data to two personal computers 200 according to a printer identification number of the third management table as a transmission destination to collectively notify update of the two stored print data (S1724). FIG. 18C shows one example of a screen that is displayed on the display means 205 of the personal computers 200, 200, 200 in accordance with notification. On this screen, the registered name and the create data and time of the updated two stored print data are displayed. In addition, the CPU 101 may correct the two stored print data of the first management table so as to make the number of printer thereof into 0 and delete all of the printer identification numbers (S1725). Next, the CPU 101 may store the new received print data in the HDD 103 (S1719).

On the other hand, when the CPU 101 judges that the received print data is not obtained by updating the stored print data in S1713 (S1713: NO), the CPU 101 may newly store the received print data (S1727) and may store the received print data in the HDD 103 (S1719). In addition, when the CPU 101 judges that the number of printer is 0 (S1714: YES), the CPU 101 may correct only the create date and time of the stored print data of the first management table into a create date and time of the received print data (S1726). Next, the CPU 101 may store the received print data in the HDD 103 (S1719).

The print data processing system according to the fifth embodiment is as described above, however, the scope is not limited to this. For example, as described in the second embodiment, in the case of receiving the print data according to the update of the stored print data from the personal computer 200 that transmitted the storage indicating data of the stored print data, the print data processing system may be constituted so as to notify the computer of the update of the stored print data except for the personal computer 200 that transmitted the storage indicating data of the print data. Alternatively, as described in the third embodiment, the print data processing system may be constituted so that one personal computer 200 that updated the stored print data can send a message to other personal computers 200 that indicate print of the stored print data.

The print data processing system according to the fifth embodiment is constituted so as to collectively notify the computer of the update only when the system receives the print data to which the data for batch notification related to "collectively notify" is attached, however, the scope is not limited to this. For example, when the system is provided with counting means, the data of batch notification according to "collectively notify" is attached to the system within 24 hours till the date of batch notification according to the last "notify together" is attached to the system and the system does not receive the print data, the system may be constituted so as to automatically perform collective notification.

With respect to the same parts as the first to fourth embodiments, the same reference numerals are given to them and the detailed explanations are herein omitted.

According to an embodiment, a printer may store the print data and a print history and may notify a plurality of data processing indicating apparatus (or an external apparatus) which have referred and/or have printed the print data of update of the print data. Therefore, it is not necessary for the user to register in advance in order to receive a notification of the update.

In addition, according to an embodiment, it is possible to prevent a wasteful notification to the user of the data processing indicating apparatus that has already known the update of the print data.

In addition, according to an embodiment, it is possible to attach desired data to a notification of update.

In addition, according to an embodiment, the user may determine whether to have notification of update or not so as to avoid a wasteful notification.

In addition, according to an embodiment, it is possible to collectively notify update of a plurality of print data, so that there is no trouble of frequent notifications on the side receiving the notification.

As this description may be embodied in several forms without departing from the spirit of essential characteristics thereof, the present embodiments are therefore illustrative and not restrictive, since the scope of the subject matter is defined by the appended claims rather than by the description preceding them, and all changes that fall within metes and bounds of the claims, or equivalents of such metes and bounds thereof are therefore intended to be embraced by the claims.

What is claimed is:

1. A print data processing system comprising:
a printer for printing print data, which includes:
an interface for sending and receiving data;
a storage for storing the print data received via the interface therein; and
a plurality of data processing indicating apparatuses, each of said apparatuses including an interface for sending the data, each of the data processing indicating apparatuses sending, to the printer via the interface:

identification data of itself;

name data of the print data; and any one among storage indicating data attached to the print data, the print data, and print indicating data of the print data stored in the storage, wherein the storage stores the name data, the identification data of the data processing indicating apparatus that has sent the storage indicating data, and identification data of the data processing indicating apparatus that has sent the print indicating data, the name data being related to the identification data of the data processing indicating apparatus that has sent the storage indicating data and the identification data of the data processing indicating apparatus that has sent the printer indicating data, wherein the printer further comprises a controller for performing operations of:

updating the print data received by the printer and stored in the storage; and generating update notification data for notifying update of the print data, wherein the printer sends the update notification data to the data processing indicating apparatus corresponding to the identification data related to the name data of the updated print data via the interface, and wherein the controller of the printer further performs operations of:

judging whether or not the identification data of the data processing apparatus for sending the print indicating data of the print data stored in the storage includes the identification data of the data processing apparatus that has sent the print indicating data of the received print data, when the printer receives the print data used for updating the print data stored in the storage from the data processing indicating apparatus for sending the storage indicating data of the print data stored in the storage; and deleting the identification data of the data processing apparatus for sending the print indicating data of the received print data among the identification data of the data processing apparatus for sending the print indicating data of the print data stored in the storage, when the judgment result shows that the identification data of the data processing apparatus for sending the print indicating data of the print data stored in the storage includes the identification data of the data processing apparatus that has sent the print indicating data of the received print data.

2. A print data processing system comprising:

a printer for printing print data, which includes:

an interface for sending and receiving data;

a storage for storing the print data received via the interface therein; and a plurality of data processing indicating apparatuses, each of said apparatuses including an interface for sending the data, each of the data processing indicating apparatuses sending, to the printer via the interface:

identification data of itself;

name data of the print data; and any one among storage indicating data attached to the print data, the print data, and print indicating data of the print data stored in the storage, wherein the storage stores the name data, the identification data of the data processing indicating apparatus that has sent the storage indicating data, and identification data of the data processing indicating apparatus that has sent the print indicating data, the name data being related to the identification data of the data processing indicating apparatus that has sent the storage indicating data and the identification data of the data processing indicating apparatus that has sent the printer indicating data, wherein the printer further comprises a controller for performing operations of:

updating the print data received by the printer and stored in the storage; and generating update notification data for notifying update of the print data, wherein the printer sends the update notification data to the data processing indicating apparatus corresponding to the identification data related to the name data of the updated print data via the interface, wherein the data processing indicating apparatus further includes a data accepting unit for accepting the data to be sent to a plurality of data processing indicating apparatuses that have sent the print indicating data, when the data processing indicating apparatus sends print data used for updating the print data stored in the storage, wherein the data processing indicating apparatus sends the accepted data to the printer being attached to the print data, wherein the printer further includes a controller for performing an operation of adding the accepted data that is received from the data processing indicating apparatus to the notification data, and wherein the printer sends the notification data having the accepted data added thereto to the data processing indicating apparatus that has sent the print indicating data.

3. A print data processing system comprising:

a printer for printing print data, which includes:

an interface for sending and receiving data;

a storage for storing the print data received via the interface therein; and a plurality of data processing indicating apparatuses, each of said apparatuses including an interface for sending the data, each of the data processing indicating apparatuses sending, to the printer via the interface:

identification data of itself;

name data of the print data; and any one among storage indicating data attached to the print data, the print data, and print indicating data of the print data stored in the storage, wherein the storage stores the name data, the identification data of the data processing indicating apparatus that has sent the storage indicating data, and identification data of the data processing indicating apparatus that has sent the print indicating data, the name data being related to the identification data of the data processing indicating apparatus that has sent the storage indicating data and the identification data of the data processing indicating apparatus that has sent the printer indicating data, wherein the printer further comprises a controller for performing operations of:

updating the print data received by the printer and stored in the storage; and generating update notification data for notifying update of the print data wherein the printer sends the update notification data to the data processing indicating apparatus corresponding to the identification data related to the name data of the updated print data via the interface, wherein the data processing indicating apparatus further includes a notification indication accepting unit for accepting an indication whether or not update should be notified to a data processing indicating apparatus that has sent the print indicating data, when the data processing indicating apparatus sends the print data used for updating the print data stored in the storage, wherein the data processing indicating apparatus sends the notification indicating data indicating the accepted indication to the printer being attached to the print data, wherein the printer further includes a controller for performing an operation of judging whether or not the indication is notification of update on the basis of the notification indicating data received from the data processing indicating apparatus, and wherein the printer sends the update notification data when the judgment result shows notification of update.

4. A print data processing system comprising:
a printer for printing print data, which includes:
   an interface for sending and receiving data;
   a storage for storing the print data received via the interface therein; and
   a plurality of data processing indicating apparatuses, each of said apparatuses including an interface for sending the data each of the data processing indicating apparatuses sending, to the printer via the interface:
      identification data of itself;
      name data of the print data; and
      any one among storage indicating data attached to the print data, the print data, and print indicating data of the print data stored in the storage,
   wherein the storage stores the name data, the identification data of the data processing indicating apparatus that has sent the storage indicating data, and identification data of the data processing indicating apparatus that has sent the print indicating data, the name data being related to the identification data of the data processing indicating apparatus that has sent the storage indicating data and the identification data of the data processing indicating apparatus that has sent the printer indicating data,
   wherein the printer further comprises a controller for performing operations of:
      updating the print data received by the printer and stored in the storage; and
      generating update notification data for notifying update of the print data,
   wherein the printer sends the update notification data to the data processing indicating apparatus corresponding to the identification data related to the name data of the updated print data via the interface,
   wherein the data processing indicating apparatus further includes a collective object indication accepting unit for accepting an indication related to a collective object indicating data attached to the print data as an object of collective notification stored in the storage so as to collectively notify the update of a plurality of print data stored in the storage,
   wherein the data processing indicating apparatus sending the storing indicating data and the collective object indicating data corresponding to the accepted indication to the printer being attached to the print data used for updating the print data stored in the storage,
   wherein the data processing indicating apparatus further includes a collective object indication accepting unit for accepting an indication related to the collective notification indicating data for indicating that notification of update of a plurality of print data stored in the storage is collectively performed,
   wherein the data processing indicating apparatus sending the storing indicating data and collective object indicating data corresponding to the accepted indication to the printer being attached to the print data used for updating the print data stored in the storage,
   wherein the printer further includes:
      a table for storing:
         the name data of the print data to which the collective object indicating data is attached, the name data being stored in the storage; and
         the identification data of a data processing indicating apparatus that has sent the print indicating data related to the name data stored in the storage; and
      a controller for performing operations of:
         judging whether or not the collective notification indicating data attached to the print data used for updating the print data stored in the storage indicates collective notification of update, the print data being received from the data processing indicating apparatus; and
         generating collective update notification data for collectively notifying update of a plurality of print data on the basis of the update notification data corresponding to the print data in response to the name data stored in the table when the judgment result indicates collective notification of update, and
   wherein the printer sends the collective update notification data to a data processing indicating apparatus corresponding to the identification data stored in the table of the data processing indicating apparatus that has sent the print indicating data, said identification data being related to the name data stored in the table.

5. A print data processing system comprising:
a printer for printing print data, which includes:
   an interface for sending and receiving data
   a storage for storing the print data received via the interface therein; and
   a plurality of data processing indicating apparatuses, each of said apparatuses including an interface for sending the data, each of the data processing indicating apparatuses sending, to the printer via the interface:
      identification data of itself;
      name data of the print data; and
      any one among storage indicating data attached to the print data, the print data, and print indicating data of the print data stored in the storage,
   wherein the storage stores the name data, the identification data of the data processing indicating apparatus that has sent the storage indicating data, and identification data of the data processing indicating apparatus that has sent the print indicating data, the name data being related to the identification data of the data processing indicating apparatus that has sent the storage indicating data and the identification data of the data processing indicating apparatus that has sent the printer indicating data, wherein the printer further comprises a controller for performing operations of:

updating the print data received by the printer and stored in the storage; and generating update notification data for notifying update of the print data, wherein the printer sends the update notification data to the data processing indicating apparatus corresponding to the identification data related to the name data of the updated print data via the interface, wherein the operation of updating the print data that is received by the printer and stored in the storage includes operations of:

judging whether or not the storage indicating data is attached to the print data received from the printer;

judging whether or not the name data of the received print data is identical with the name data of the stored print data, when the storage indicating data is attached to the print data received from the printer; and updating the received stored print data by the received print data, when the judgment result is affirmative.

6. A printer, comprising an interface for sending and receiving data and a storage for storing print data in response to storage indicating data from an external apparatus and for printing the print data stored in the storage in response to print indicating data from the external apparatus, wherein the storage stores:

name data;

identification data of the external apparatus that has sent the storage indicating data; and identification data of the external apparatus that has sent the print indicating data, and the name data is related to the identification data of the external apparatus that has sent the storage indicating data and to the identification data of the external apparatus that has sent the print indicating data, wherein the printer further comprising a controller for performing operation of:

updating the print data stored in the storage, which is the print data received from the printer; and generating update notification data for notifying update of the print data, and wherein the printer sends the update notification data to an external apparatus corresponding to the identification data related to the name data of the updated print data, further comprising a controller for performing operations of:

when the printer receives print data used for updating print data stored in the storage from the external apparatus for sending the storage indicating data stored in the storage, judging whether or not the identification data of the external apparatus for sending the print data for print data stored in the storage includes the identification data of the external apparatus for sending the storage indicating data of the received print data, and when the judgment result shows that the identification data of the external apparatus for sending the print data for print data stored in the storage includes the identification data of the external apparatus for sending the storage indicating data of the received print data, the identification data of the external apparatus for sending the storage indicating data of the received print data among the identification data of the data processing apparatus for sending the print indicating data of the print data stored in the storage is deleted from the storage.

7. The print data processing system according to claim 1, wherein, when the printer receives print data used for updating the print data stored in the storage from a data processing indicating apparatus for sending the storage indicating data, the sent storage indication data is attached to the received print data.

8. The print data processing system according to claim 2, wherein the data to be sent to a plurality of data processing indicating apparatuses that have sent the print indicating data includes at least on among the print data, a user number, the registered name of the print data, and a create date and time of the print data.

* * * * *